US012497661B2

(12) United States Patent
Dracopoli et al.

(10) Patent No.: US 12,497,661 B2
(45) Date of Patent: Dec. 16, 2025

(54) METHOD OF IMPROVING PREDICTION OF RESPONSE FOR CANCER PATIENTS TREATED WITH IMMUNOTHERAPY

(71) Applicant: PERSONAL GENOME DIAGNOSTICS, INC., Baltimore, MD (US)

(72) Inventors: Nicholas C. Dracopoli, Baltimore, MD (US); Gustavo Cerqueira, Baltimore, MD (US)

(73) Assignee: Personal Genome Diagnostics, Inc., Baltimore, MD (US)

( * ) Notice: Subject to any disclaimer, the term of this patent is extended or adjusted under 35 U.S.C. 154(b) by 1 day.

(21) Appl. No.: 16/685,439

(22) Filed: Nov. 15, 2019

(65) Prior Publication Data
US 2020/0157642 A1 May 21, 2020

Related U.S. Application Data

(60) Provisional application No. 62/767,979, filed on Nov. 15, 2018.

(51) Int. Cl.
*C12Q 1/6886* (2018.01)

(52) U.S. Cl.
CPC ..... *C12Q 1/6886* (2013.01); *C12Q 2600/106* (2013.01); *C12Q 2600/156* (2013.01)

(58) Field of Classification Search
None
See application file for complete search history.

(56) References Cited

U.S. PATENT DOCUMENTS

| 2003/0092019 | A1* | 5/2003 | Meyer | C07K 14/47 |
| | | | | 435/6.14 |
| 2012/0015050 | A1* | 1/2012 | Abkevich | G16B 20/10 |
| | | | | 514/394 |
| 2017/0313775 | A1 | 11/2017 | Diaz et al. | |
| 2018/0291074 | A1 | 10/2018 | Chan et al. | |
| 2018/0363066 | A1* | 12/2018 | Chalmers | C12Q 1/6886 |
| 2019/0092864 | A1* | 3/2019 | Chan | C07K 16/2827 |

FOREIGN PATENT DOCUMENTS

| WO | WO-9952942 A2 * | 10/1999 | ......... C07K 14/4705 |
| WO | WO 2017/151502 | 9/2017 | |
| WO | WO 2017/151517 | 9/2017 | |
| WO | WO 2018/005276 | 1/2018 | |
| WO | WO 2018/183928 | 4/2018 | |
| WO | WO 2018/132749 | 7/2018 | |

OTHER PUBLICATIONS

Riaz (International Immunology (2016) vol. 28, pp. 411-419).*
Snyder (The New England Journal of Medicine (2014) vol. 371, pp. 2189-2199).*
Anagnostou (Cancer Discovery (2017), vol. 7, pp. 264-276).*
Garrido (Current opinion in Immunology (2016) vol. 39, p. 44-51).*
Rodriguez (Oncol Letter (2017) vol. 14, p. 4415-4427),.*
Sade-Feldman (nature communication (Oct. 2017) 8:1136, pp. 1-11).*
Benner et al (Trends in Genetics (2001) vol. 17, pp. 414-418).*
May et al (Science (1988) vol. 241, p. 1441).*
Hirschhorn et al. (Genetics in Medicine. vol. 4, No. 2, pp. 45-61, Mar. 2002).*
Ioannidis (Nature Genetics, vol. 29, pp. 306-309, Nov. 2001).*
Hegele (Arterioscler Thromb Vasc Biol. 2002;22:1058-1061).*
Pennisi (1998) ScienceMag (vol. 281, pp. 1787-1789).*
Garrido (Current opinion in immunology (2016) vol. 39, pp. 44-51).*
McGranahan (Cell (2017) vol. 171, 1259-1271, epub Oct. 26, 2017).*
Mouw (Cancer Discov. Jul. 2017 ; 7(7): 675-693).*
Adalsteinsson (.Nat Commun . Nov. 6, 2017;8(1):1324).*
Rizvi ( Science. Apr. 3, 2015; 348(6230): 124-128. doi:10.1126/science.aaa1348).*
Chalmers et al. Genome Medicine (2017) 9:34.*
Dubbink (The Journal of Molecular Diagnostics vol. 18 No. 5 Sep. 2016).*
Jiao (BMC Genomics Jan. 15, 2018 19:50).*
Sade-Feldman (Nature Communications 8:1136 pp. 1-11 Pub Online Oct. 26, 2017).*
Application No. CA 3,120,200 , Office Action, mailed on Jan. 16, 2025, 4 pages.
Chaudhary, Ruchi et al.: "*A scalable solution for tumor mutational burden from formalin-fixed, paraffin-embedded samples using the Oncomine Tumor Mutation Load Assay*," Transl Lung Cancer Res, Dec. 1, 2018, vol. 7, No. 6, pp. 616-630.
Chowell, Diego et al.: "*Patient HLA class I genotype influences cancer response to checkpoint blockade immunotherapy*," Science, Dec. 7, 2017, vol. 359, pp. 582-587.
International Search Report issued Feb. 11, 2020, regarding PCT/US2019/061710.
Sade-Feldman, Moshe et al.: "*Resistance to checkpoint blockade therapy through inactivation of antigen presentation*," Nat Commun, Oct. 26, 2017, vol. 8, pp. 1-11.
Written Opinion of the International Searching Authority issued Feb. 11, 2020, regarding PCT/US2019/061710.
Yan, Xinyu et al.: "*Prognostic Factors for Checkpoint Inhibitor Based Immunotherapy: An Update With New Evidences*," Front Pharmacol, Sep. 20, 2018, vol. 9, pp. 1-17.

(Continued)

*Primary Examiner* — Amanda Haney
(74) *Attorney, Agent, or Firm* — Kilpatrick Townsend & Stockton LLP

(57) ABSTRACT

A method of determining a therapeutic regimen in a patient with cancer comprising determining in a sample from the patient the tumor mutation burden (TMB) and loss of heterozygosity (LOH), wherein high TMB in combination with no LOH is indicative of a positive outcome when treated with a checkpoint inhibitor and high TMB with LOH is indicative of a poor outcome, is provided herein.

22 Claims, 12 Drawing Sheets

(56) References Cited

OTHER PUBLICATIONS

Yarchoan, Mark et al.: "*Tumor Mutational Burden and Response Rate to PD-1 Inhibition*," N Engl J Med, Dec. 21, 2017, vol. 377, pp. 2500-2501.

Anonymous, "Caris Molecular Intelligence: Total Mutational Load—Immune Checkpoint Inhibitors Response", Caris Life Sciences, (Aug. 10, 2016), pp. 1-2, XP055889553.

CA Third Party Observation in Canadian Patent Application No. CA3120200, dated May 9, 2022, 17 pages.

EP Third Party Observation in European Patent Application No. EP19885138.8, dated on Apr. 6, 2022, 7 pages.

JP Third Party Observation in Japanese Patent Application No. 2021-526801, dated on May 16, 2022, 14 pages.

Steuer Conor E et al, "Tumor Mutation Burden: Leading Immunotherapy to the Era of Precision Medicine?", Journal of Clinical Oncology, Mar. 1, 2018, vol. 36, No. 7, pp. 631-632.

Rizvi Hira et al, "Molecular Determinants of Response to Anti-Programmed Cell Death (PD)-1 and Anti-Programmed Death-Ligand 1 (PD-L1) Blockade in Patients With Non-Small-Cell Lung Cancer Profiled With Targeted Next-Generation Sequencing", Journal of Clinical Oncology, Mar. 1, 2018, vol. 36, No. 7, pp. 633-641.

EP European Search Report in European Application No. 19885138.8, dated Jul. 7, 2022, 15 pages.

\* cited by examiner

| | #homozygous sites | #heterozygous sites |
|---|---|---|
| PGRD00426T_TMB2 | 52 | 0 |
| PGRD00431T_TMB2 | 52 | 0 |
| PGRD01068T_S1_TMB2 | 52 | 0 |
| TMBB0094T_G1S1_TMB2 | 52 | 0 |

Putative LOH MHC

| | | |
|---|---|---|
| PGRD00425T_TMB2 | 41 | 10 |
| PGRD00448T_TMB2 | 41 | 11 |
| PGRD00830T_TMB2 | 41 | 11 |

Putative heterozygous MHC

FIG. 8

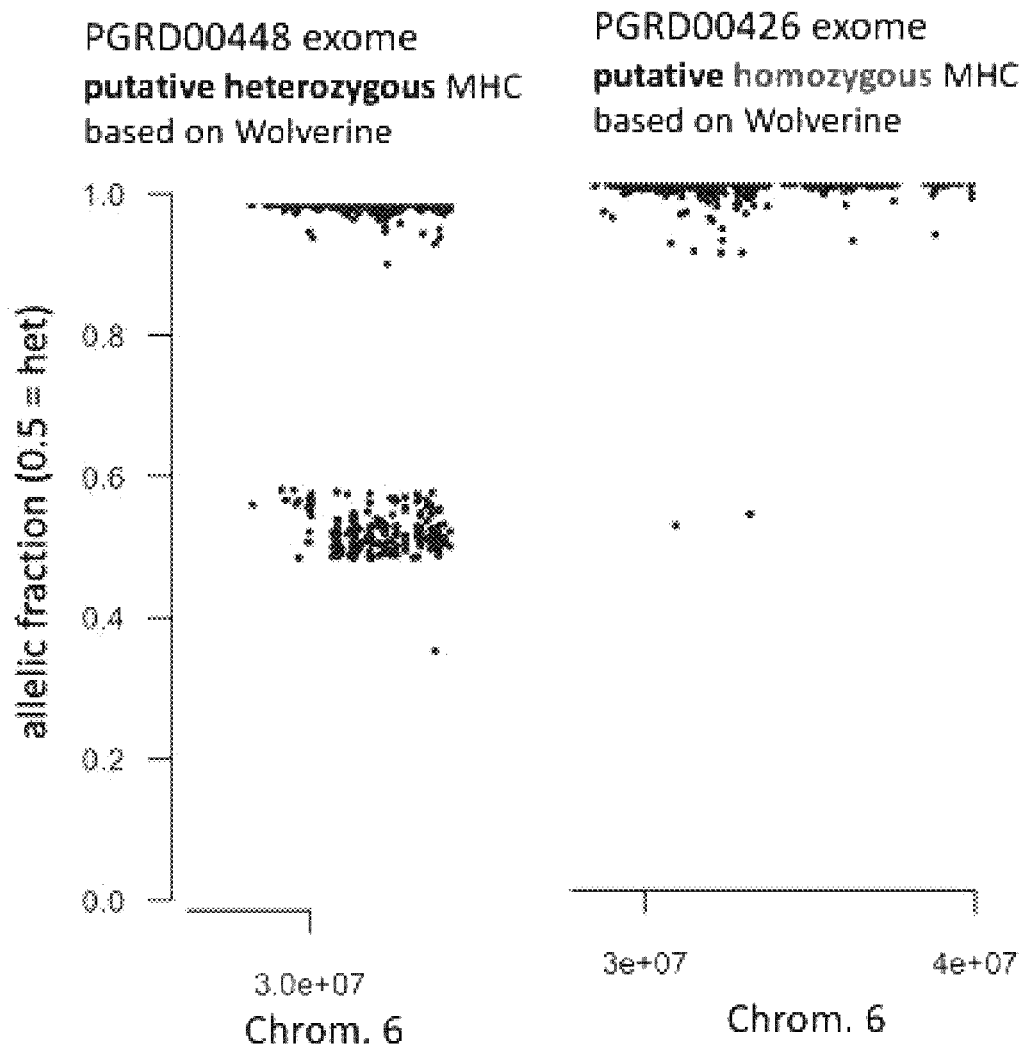
FIG. 9A                    FIG. 9B

METHOD OF IMPROVING PREDICTION OF RESPONSE FOR CANCER PATIENTS TREATED WITH IMMUNOTHERAPY

CROSS-REFERENCE TO RELATED APPLICATIONS

This application claims the benefit of priority under 35 U.S.C. § 119(e) to U.S. Ser. No. 62/767,979 filed Nov. 15, 2018, which is hereby incorporated by reference in its entirety.

BACKGROUND OF THE INVENTION

Field of the Invention

This invention relates generally to cancer and immunotherapy and more specifically to analysis of tumor mutation burden (TMB) in combination with loss of heterozygosity (LOH) for selection of responsive cancer therapy.

Background Information

Cancer is characterized by proliferation of abnormal cells. The success of conventional treatments depends on the type of cancer and the stage at which it is detected. Many treatments include costly and painful surgeries and chemotherapies and are often unsuccessful or only modestly prolong a patient's life. Promising treatment methods in development include tumor vaccines or T-cell therapy that target tumor antigens enabling a patient's immune system to differentiate between tumor and healthy cells and to elicit an immune response in the patient. See Chen, et al., Oncology Meets Immunology: The Cancer-Immunity Cycle, Immunity 39, Jul. 25, 2013, the contents of which are incorporated herein for all purposes in their entirety.

Neoantigens are a class of immunogens associated with tumor-specific mutations unique to a patient's cancer. Neoantigens have shown promise as targets for antitumor immunity techniques including adaptive T-cell transfer with tumor infiltrating lymphocytes (TIL), cancer vaccines, and checkpoint inhibitors. See Hacohen, et al., Getting Personal with Neoantigen-Based Therapeutic Cancer Vaccines, Cancer Immunol Res, Jul. 2013 1, 11; Robbins, et al., Mining exomic sequencing data to identify mutated antigens recognized by adoptively transferred tumor-reactive T cells, Nature Medicine 19, 747-752 (2013); the contents of each of which are incorporated herein for all purposes in their entirety.

The PD-1 receptor-ligand interaction is a major pathway hijacked by tumors to suppress immune control. The normal function of PD-1, expressed on the cell surface of activated T-cells under healthy conditions, is to down-modulate unwanted or excessive immune responses, including autoimmune reactions. The ligands for PD-1 (PD-L1 and PD-L2) are constitutively expressed or can be induced in various tumors. Binding of either PD-1 ligand to PD-1 inhibits T-cell activation triggered through the T-cell receptor. PD-L1 is expressed at low levels on various non-hematopoietic tissues, most notably on vascular endothelium, whereas PD-L2 protein is only detectably expressed on antigen-presenting cells found in lymphoid tissue or chronic inflammatory environments. PD-L2 is thought to control immune T-cell activation in lymphoid organs, whereas PD-L1 serves to dampen unwanted T-cell function in peripheral tissues. Although healthy organs express little (if any) PD-L1, a variety of cancers were demonstrated to express abundant levels of this T-cell inhibitor. High expression of PD-L1 on tumor cells (and to a lesser extent of PD-L2) has been found to correlate with poor prognosis and survival in various cancer types, including renal cell carcinoma (RCC), pancreatic carcinoma, hepatocellular carcinoma, ovarian carcinoma and non-small cell lung cancer (NSCLC). Furthermore, PD-1 has been suggested to regulate tumor-specific T cell expansion in patients with malignant MEL. The observed correlation of clinical prognosis with PD-L1 expression in multiple cancers suggests that the PD-1/PD-L1 pathway plays a critical role in tumor immune evasion and should be considered as an attractive target for therapeutic intervention.

Many tumor cells survive due to a suppressed immune response that prevents their destruction. This may be overcome during treatment with checkpoint inhibitors. Checkpoint inhibitors act by blocking the interaction of the checkpoint receptors with their cognate ligands. Tumor Mutation Burden (TMB) serves as a surrogate marker of the immune response because it provides a readout on altered proteins that should be recognized by the immune system but are not due to suppressed immune responses by the tumor. TMB is measured through sampling regions of the cancer genome to estimate the number of mutations/Mb. A high TMB score can be associated with better response to immunotherapy because the tumor carries more somatic mutations and has a higher chance of presenting an immunogenic neoepitope. However, not all high TMB tumors are impacted by therapy, limiting the utility of TMB as a biomarker for responsiveness to checkpoint inhibitors.

Limited usefulness of TMB as a biomarker may be attributed to not all somatic mutations becoming neoantigens (Miller A et al. High somatic mutation and neoantigen burden are correlated with decreased progression-free survival in multiple myeloma. *Blood Cancer J.* 7, e612 (2017) doi:10.1038/bcj.2017.94). Potential neoantigens are defined for each mutation and MI-IC haplotype combination, with an $IC_{50}$ of less than 500 nM being WT and an $IC_{50}$ of greater than 500 nM being mutant. Moreover, neoantigen prediction for the same mutation differs for each MHC Class I haplotype. As an example, analysis of multiple myeloma in the COMPASS study (Miller A et al. High somatic mutation and neoantigen burden are correlated with decreased progression-free survival in multiple myeloma. *Blood Cancer J.* 7, e612 (2017) doi:10.1038/bcj2017.94) showed 63.9 missense mutations, 23.5 neoantigens, and 9.4 expressed neoantigens per patient.

Loss of heterozygosity (LOH) of MHC Class I occurs in several tumors. LOH frequency of the MHC region on chromosome 6p21 has been reported as 70% for squamous head and neck cancer, 96% for breast carcinoma, 87% for colon carcinomas, 39% for pancreatic cancer, and 63% for melanoma (Garrido F and Algarra I. MHC antigens and tumor escape from immune surveillance. Adv Cancer Res. 2001; 83:117-58). LOH frequency of the B2M region on chromosome 15q21 has been reported as 35% for colon carcinomas, 16% for melanoma, 44% for bladder cancer, and 7% for renal cancer (Maleno I. et al. Frequent loss of heterozygosity in the β2-microglobulin region of chromosome 15 in primary human tumors. Immunogenetics. 2011 February; 63(2):65-71). LOH at MHC and B2M loci correlates with shorter survival of patients treated with checkpoint inhibitors (Chowell, D., et al. Patient HLA class I genotype influences cancer response to checkpoint blockade immunotherapy. Science 359:582-587, 2018; Sade-Feldman, M., et al., Resistance to checkpoint blockade therapy through inactivation of antigen presentation. Nature Communications 8:1136-1147, 2017). Moreover, HLA haplotype affects survival in patients treated with a checkpoint inhibitor, with a 3.7 fold difference in hazard ratio for B44 and B62 HLA supertypes, for example (Chowell, D., et al. Patient HLA class I genotype influences cancer response to checkpoint blockade immunotherapy. Science 359:582-587, 2018).

Thus, based on the complexity of factors that affect immune responses in cancer, there exists a need for predicting treatment outcomes with immunotherapy that are useful for determining therapeutic regimens and selecting patients for treatment.

SUMMARY OF THE INVENTION

The methods provided herein are based on the seminal discovery that HLA Loss of Heterozygosity (LOH) status combined with Tumor Mutation Burden (TMB) score improves the prediction of response for cancer patients being treated with checkpoint inhibitors. The inventors had previously shown that using a 507 gene tissue panel one could find and reliably detect LOH of the MHC region, in the absence of whole exome sequencing. It was previously believed that if a patient had high TMB, they would be a responder to checkpoint therapy, however, the present invention shows that if a patient has TMB and also LOH of MHC regions, they may not in fact be a responder to the checkpoint inhibitor therapy and in some cases should not be given checkpoint inhibitors. Based on the present invention, a patient's survival outcome may be significantly improved.

Provided herein, in some embodiments, are methods of determining a therapeutic regimen in a patient with cancer including determining in a sample from the patient the tumor mutation burden (TMB) and loss of heterozygosity (LOH), wherein high TMB in combination with no LOH is indicative of a positive outcome when treated with a checkpoint inhibitor and high TMB with LOH is indicative of a poor outcome. In some embodiments, the cancer is a tumor. In some embodiments, the sample is from blood, saliva, plasma, serum, urine, or other biological fluid. In some embodiments, the sample is from a tumor. In some embodiments, the LOH is determined in regions near or including MHC Class I genes. In some embodiments, the LOH is determined in regions of the B2M gene. In some embodiments, the cancer is selected from breast, pancreatic, lung, melanoma, hematopoietic cancers and leukemias, colon, kidney, head and neck, brain, bone, ovarian, cervical and prostate cancer. In some embodiments, the checkpoint inhibitor is Pembrolizumab (KEYTRUDA), Nivolumab (OPDIVO), Atezolizumab (TECENTRIQ), or Ipilimumab (YERVOY). In some embodiments, the step of determining includes sequencing one or more exomes from the sample, or regions thereof. In some embodiments, tumor mutations include a neoantigen or neoepitope recognized by a T cell.

Provided herein, in some embodiments, are methods of selecting a patient with cancer for treatment with a checkpoint inhibitor including selecting the patient for treatment with the checkpoint inhibitor when tumor mutation burden (TMB) is high in the absence of loss of heterozygosity (LOH) in a sample obtained from the patient. In some embodiments, high TMB in combination with no LOH is indicative of a positive outcome when treated with the checkpoint inhibitor and high TMB with LOH is indicative of a poor outcome. In some embodiments, the sample is a tumor sample. In some embodiments, the sample is from blood, saliva, plasma, serum, urine, or other biological fluid. In some embodiments, the LOH is in regions near or including MHC Class I genes. In some embodiments, the LOH is in regions of the B2M gene. In some embodiments, the cancer is selected from breast, pancreatic, lung, melanoma, hematopoietic cancers and leukemias, colon, kidney, head and neck, brain, bone, ovarian, cervical and prostate cancer. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY). In some embodiments, determination of TMB and LOH includes sequencing one or more exomes from the sample, or regions thereof. In some embodiments, tumor mutations include a neoantigen or neoepitope recognized by a T cell.

Provided herein, in some embodiments, are methods of treating a patient with cancer including: (i) selecting the patient for treatment with a checkpoint inhibitor when tumor mutation burden (TMB) is high in the absence of loss of heterozygosity (LOH) in a sample obtained from the patient; and (ii) administering to the patient an effective amount of the checkpoint inhibitor. In some embodiments, high TMB in combination with no LOH is indicative of a positive outcome when treated with the checkpoint inhibitor and high TMB with LOH is indicative of a poor outcome. In some embodiments, the sample is a tumor sample. In some embodiments, the sample is from blood, saliva, plasma, serum, urine, or other biological fluid. In some embodiments, the LOH is in regions near or including MHC Class I genes. In some embodiments, the LOH is in regions of the B2M gene. In some embodiments, the cancer is selected from breast, pancreatic, lung, melanoma, hematopoietic cancers and leukemias, colon, kidney, head and neck, brain, bone, ovarian, cervical and prostate cancer. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), Avelumab (BAVENCIO), Durvalumab (IMFINZI), or Ipilimumab (YERVOY). In some embodiments, determination of TMB and LOH includes sequencing one or more exomes from the sample, or regions thereof. In some embodiments, tumor mutations include a neoantigen or neoepitope recognized by a T cell.

BRIEF DESCRIPTION OF THE DRAWINGS

FIG. 8 shows pilot evaluation of heterozygosity in the vicinity of MHC genes of a few samples with and without potential LOH of MHC.

FIGS. 9A-9B show confirmation of LOH signals found using PGDx Elio™ complete (Wolverine) by exome data.

DETAILED DESCRIPTION OF THE INVENTION

The interpretation of the TMB score as a biomarker for immunotherapy such as treatment with checkpoint inhibitors, for example, can only be accurate if patients have a functional immune system. If a tumor cell cannot present neoantigens to CD-8$^+$ T-cells, then the high mutation burden (TMB) will be irrelevant and cannot predict response to immunotherapy accurately.

In some embodiments, provided herein are methods for determining a therapeutic regimen in a patient with cancer comprising determining in a sample from the patient the tumor mutation burden (TMB) and loss of heterozygosity (LOH), wherein high TMB in combination with no LOH is indicative of a positive outcome when treated with a checkpoint inhibitor and high TMB with LOH is indicative of a poor outcome.

In some embodiments, provided herein are methods for selecting a patient with cancer for treatment with a checkpoint inhibitor comprising selecting the patient for treatment with the checkpoint inhibitor when TMB is high in the absence of LOH in a sample obtained from the patient.

In some embodiments, provided herein are methods of treating a patient with cancer comprising: (i) selecting the patient for treatment with a checkpoint inhibitor when TMB is high in the absence of LOH in a sample obtained from the patient; and (ii) administering to the patient an effective amount of the checkpoint inhibitor.

Loss of Heterozygosity

As used herein, the term "loss of heterozygosity" or "LOH" refers to the loss of one parent's contribution to a cell or individual. LOH can be the result of direct deletion, deletion due to unbalanced rearrangements, gene conversion, mitotic recombination, or loss of a chromosome (monosomy), for example. Thus, LOH can refer to the loss of genetic material that can include loss of an entire gene and the surrounding chromosomal region, although less than an entire gene may be lost. For example, LOH can refer to the loss of a functional gene as a result of complete or partial loss of the gene. As used herein, the term "copy-neutral LOH" refers to LOH without a net change in the copy number or a gene in an individual or cell. Copy-neutral LOH can result from uniparental disomy (UPD) and gene conversion, for example. In UPD, an individual or cell receives two copies of a chromosome, or part of a chromosome, from one parent due to errors in meiosis I or meiosis II, for example. The methods provided herein contemplate any mechanism for LOH.

Figure 1:
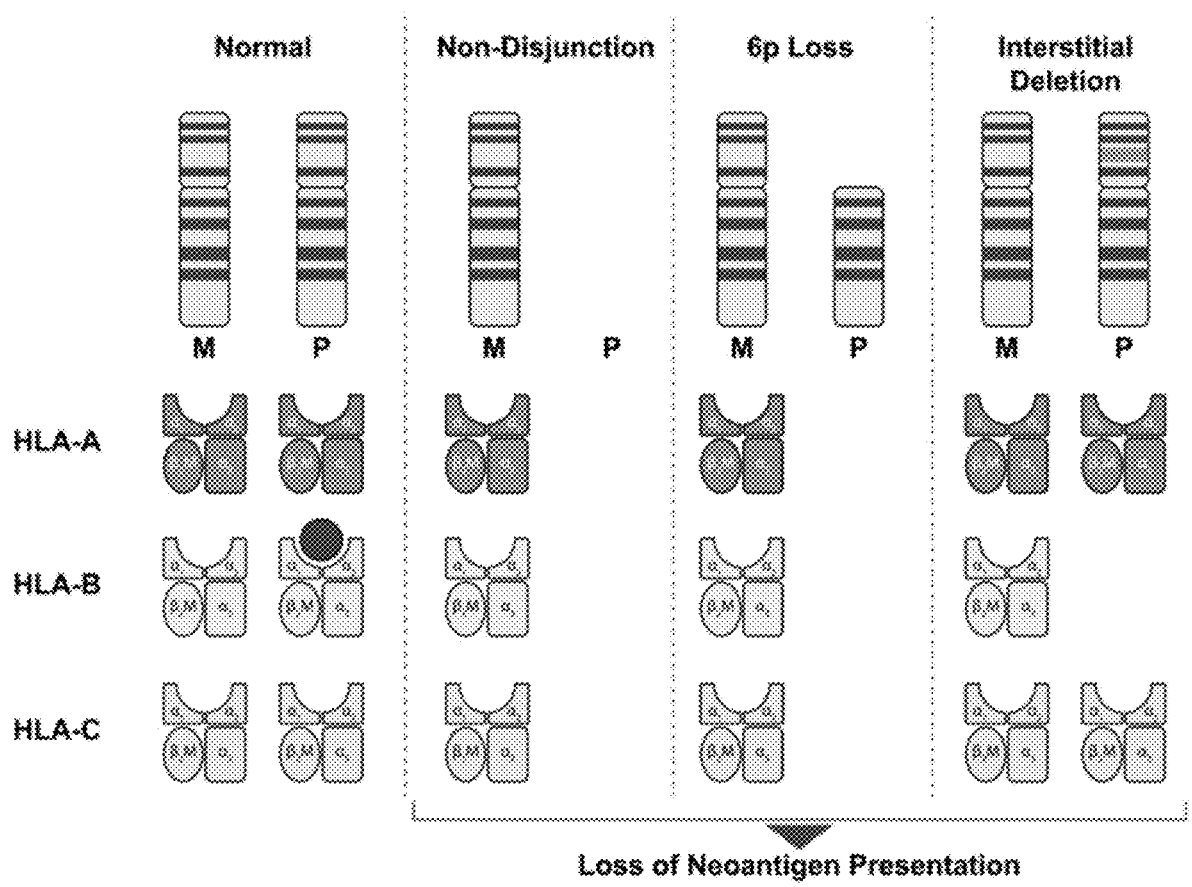
FIG. 1 shows different scenarios of loss of heterozygosity of MHC Class I.

Loss of heterozygosity (LOH) of the neoantigen presenting HLA Class I/Beta-2-microglulin (B2M) complex is a mechanism of immune evasion in viral infected or tumor cells. For example, loss of the parental allele of MHC Class I can occur due to nondisjunction during mitosis, one arm loss, or interstitial deletion (FIG. 1) and may restrict the number of potential neoantigens that can be presented on the cell surface.

Most incidences of LOH at the HLA Class I and B2M genes can be identified using bioinformatic approaches to SNP analyses and copy number variation (CNV) of NGS data containing sequence of chromosome 6 (HLA Class I) and chromosome 15 (B2M). The sequence information derived from the short arm of chromosome 6 (HLA Class I) and the long arm of chromosome 15 are particularly important to derive LOH of those genes/regions.

Allelic imbalance of HLA is characterized as somatic amplification/deletion causing a tumor cell to present an uneven number of copies of the two original HLA alleles found in the normal cells of that individual. Loss of heterozygosity (LOH) of HLA is an extreme case of allelic imbalance defined by the complete loss, or non-detectability of one of the two original HLA alleles in the tumor cell. As used herein, loss of heterozygosity (LOH) of HLA refers to both events described above: per se LOH of HLA and the more general concept of allelic imbalance of HLA.

Immunotherapy

The methods provided herein include determining a therapeutic regimen in a patient with cancer, selecting a patient with cancer for treatment, and/or treating a patient with cancer. In some embodiments, the therapeutic regimen or treatment is immunotherapy. In some embodiments, the therapeutic regimen or treatment is checkpoint inhibitor therapy (described below).

Immunotherapy includes treatment with activation immunotherapies and treatment with suppression immunotherapies. Activation immunotherapies elicit or activate an immune response, while suppression immunotherapies reduce or suppress an immune response. Immunotherapy can include treatment with immune modulators, such as interleukins, cytokines, chemokines, immunomodulatory imide drugs (IMiDs), and others. Any interleukin, cytokine, chemokine, or immunomodulatory imide drug (IMiD) can be used for immunotherapy. Exemplary interleukins for immunotherapy include IL-1, IL-2, IL-3, IL-4, IL-5, IL-6, IL-7, IL-8, IL-10, IL-12, IL-15, IL-18, IL-21, and IL-23. Exemplary cytokines for immunotherapy include interferons, TNF-α, TGF-β, G-CSF, and GM-CSF. Exemplary chemokines for immunotherapy include CCL3, CCL26, and CXCL7. Exemplary IMiDs include thalidomide and its analogues lenalidomide, pomalidomide, and apremilast. Other immunomodulators include cytosine phosphate-guanosine, oligodeoxynucleotides, and glucans, for example.

Cancer immunotherapy generally involves stimulation of the immune system to destroy cancer cells and tumors. Exemplary cancer immunotherapy includes CAR T-cell therapy that introduces chimeric antigen receptors (CARs) to a patient's T cells to generate CAR-T cells. CAR-T cells are then introduced into the patient's bloodstream to treat cancer by adoptive cell transfer (ACT). CARs generally include antigen recognition domains that can target antigens expressed on the cell surface of cancer cells and one or more signaling domains. Thus, CAR-T cells can target and destroy cancer cells that express a target antigen. Exemplary CAR-T cell therapies include tisagenlecleucel (KYMRIAH) and axicabtagene ciloleucel (YESCARTA).

A further cancer immunotherapy includes TCR therapy, another type of ACT. Similar to CAR-T cell therapy, T cells are taken from a patient, reengineered, and introduced to the patient. A further type of ACT includes tumor-infiltrating lymphocyte (TIL) therapy. TILs from a patient are isolated from a patient's tumor tissue and expanded in vitro, followed by introduction into the patient.

Yet another type of cancer immunotherapy is treatment with monoclonal antibodies. Monoclonal antibodies for use in immunotherapy can be naked, i.e., non-conjugated, or conjugated, i.e., have a chemotherapy drug or radioactive particle attached to them. In addition to monoclonal antibodies, other molecules such as interleukins and cytokines, for example, can be conjugated for targeting cancer cells. As an example, denileukin diftitix (ONTAK) includes IL-2 attached to diphtheria toxin. Further, monoclonal antibodies for cancer immunotherapy can be bispecific, i.e., designed to recognize and bind to two different proteins. Thus, bispecific monoclonal antibodies can recognize more than one antigen on the surface of a cancer cell, for example. As another example, a bispecific antibody can recognize a protein or antigen on a cancer cell and a protein or antigen on an immune cell, thereby promoting the immune cell to attack the cancer cell.

Exemplary monoclonal antibodies for treating cancer include alemtuzumab (CAMPATH), trastuzumab (HERCEPTIN), ibritumomab tiuxetan (ZEVALIN), brentuximab vedotin (ADCETRIS), ado-trastuzumab emtansine (KADCYLA), blinatumomab (BLINCYTO), bevacizumab (AVASTIN), and cetuximab (ERBITUX).

Further cancer immunotherapies include cancer vaccines that elicit an immune response against cancer cells. Yet another cancer immunotherapy is "checkpoint inhibitor therapy," as described further below.

Checkpoint Inhibitor Therapy

"Checkpoint inhibitor therapy" is a form of cancer treatment that uses or targets immune checkpoints which affect immune system functioning. Immune checkpoints can be stimulatory or inhibitory. Tumors can use these checkpoints to protect themselves from immune system attacks. Checkpoint therapy can block inhibitory checkpoints, restoring immune system function. Checkpoint proteins include programmed cell death 1 protein (PDCD1, PD-1; also known as CD279) and its ligand, PD-1 ligand 1 (PD-L1, CD274), cytotoxic T-lymphocyte-associated protein 4 (CTLA-4), A2AR (Adenosine A2A receptor), B7-H3 (or CD276), B7-H4 (or VTCN1), BTLA (B and T Lymphocyte Attenuator, or CD272), IDO (Indoleamine 2,3-dioxygenase), MR (Killer-cell Immunoglobulin-like Receptor), LAG3 (Lymphocyte Activation Gene-3), TIM-3 (T-cell Immunoglobulin domain and Mucin domain 3), and VISTA (V-domain Ig suppressor of T cell activation).

Programmed cell death protein 1, also known as PD-1 and CD279 (cluster of differentiation 279), is a cell surface receptor that plays an important role in down-regulating the immune system and promoting self-tolerance by suppressing T cell inflammatory activity. Without being limited by theory, PD-1 is an immune checkpoint and guards against autoimmunity through a dual mechanism of promoting apoptosis (programmed cell death) in antigen-specific T-cells in lymph nodes while simultaneously reducing apoptosis in regulatory T cells (anti-inflammatory, suppressive T cells). PD-1 has two ligands, PD-L1 and PD-L2, which are members of the B7 family. PD-L1 protein is upregulated on macrophages and dendritic cells (DC) in response to LPS and GM-CSF treatment, and on T cells and B cells upon TCR and B cell receptor signaling, whereas in resting mice, for example, PD-L1 mRNA can be detected in the heart, lung, thymus, spleen, and kidney. PD-L1 is expressed on almost all murine tumor cell lines, including PA1 myeloma, P815 mastocytoma, and B16 melanoma upon treatment with IFN-γ. PD-L2 expression is more restricted and is expressed mainly by DCs and a few tumor lines.

PD-L1 is expressed in several cancers. Monoclonal antibodies targeting PD-1 can boost the immune system for the treatment of cancer. Many tumor cells express PD-L1, an immunosuppressive PD-1 ligand; inhibition of the interaction between PD-1 and PD-L1 can enhance T-cell responses in vitro and mediate preclinical antitumor activity.

CTLA4 or CTLA-4 (cytotoxic T-lymphocyte-associated protein 4), also known as CD152 (cluster of differentiation 152), is a protein receptor that, functioning as an immune checkpoint, downregulates immune responses. CTLA4 is constitutively expressed in regulatory T cells but generally upregulated in conventional T cells after activation, especially in cancers. CTLA4 is a member of the immunoglobulin superfamily that is expressed by activated T cells and transmits an inhibitory signal to T cells. CTLA4 is homologous to the T-cell co-stimulatory protein, CD28, and both molecules bind to CD80 and CD86, also called B7-1 and B7-2 respectively, on antigen-presenting cells. Without being limited by theory, CTLA-4 binds CD80 and CD86 with greater affinity and avidity than CD28 thus enabling it to outcompete CD28 for its ligands. CTLA4 transmits an inhibitory signal to T cells, whereas CD28 transmits a stimulatory signal. CTLA4 is also found in regulatory T cells and contributes to its inhibitory function. T cell activation through the T cell receptor and CD28 leads to increased expression of CTLA-4.

Several checkpoint inhibitors can be used to treat cancer. PD-1 inhibitors include Pembrolizumab (KEYTRUDA) and Nivolumab (OPDIVO), for example. PD-L1 inhibitors include Atezolizumab (TECENTRIQ), Avelumab (BAVENCIO) and Durvalumab (IMFINZI), for example. CTLA-4 inhibitors include Iplimumab (YERVOY), for example. Other checkpoint inhibitors include, for example, an anti B7-H3 antibody (MGA271), an anti-KIR antibody (Lirilumab) and an anti-LAG3 antibody (BMS-986016). Any checkpoint inhibitor can be used in the methods described herein. Further, the response to any checkpoint inhibitor can be determined or predicted using the methods described herein. In some embodiments, the checkpoint inhibitor of the methods described herein is Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY).

Tumor Mutational Burden

The methods described herein include determining tumor mutational burden (TMB) in patient samples and/or using TMB to select patients with cancer for treatment, for example. TMB can serve as a surrogate marker of the immune response because it provides a readout on altered proteins that should be recognized by the immune system but are not due to suppression of immune responses by the tumor. TMB can be measured through sampling regions of the cancer genome to estimate the number of mutations/Mb. A high TMB score can be associated with better response to immunotherapy because the tumor carries more somatic mutations and has a higher chance of presenting an immunogenic neoepitope.

Samples may be tested for high mutational burden by identifying tumors with at least 100, at least 200, at least 300, at least 400, at least 500, at least 600, at least 700, at least 800, at least 900, at least 1000, at least 1100, at least 1200, at least 1300, at least 1400, at least 1500, or at least 1600 mutations per tumor genome. High mutational burden means a large number of somatic mutations in the tumor relative to normal tissues of the individual. An average number of somatic mutations in a non-microsatellite instable (MSI) tumor is about 70 somatic mutations. Different types of somatic mutations can contribute to TMB, including missense mutations, nonsense mutations, insertions and deletions, for example.

Determination of LOH

The methods described herein include determining loss of heterozygosity (LOH) in patient samples and/or using LOH to select patients with cancer for treatment, for example. In some embodiments, LOH is determined in combination with TMB for determining a therapeutic regimen in a patient with cancer, as provided by the methods described herein. In some embodiments, the methods provided herein use LOH in combination with TMB to select patients with cancer for treatment. As described in the Examples below, the methods described herein provide for the use of existing data from NGS sequencing with the PGDx Elio™ tissue complete test to: 1) Identify somatic alterations of genes in the antigen presentation complex; 2) Use these data to infer if there is a normal or abnormal antigen presentation complex; and 3) Use these data to refine TMB-based prediction of response to immunotherapy.

Any gene or multiple genes can be analyzed for LOH in the methods provided herein. In some embodiments, LOH is determined in regions near or including MHC genes. Both MHC Class I and MHC Class II genes can be analyzed for LOH. In some embodiments, LOH is determined in regions near or including MHC Class I genes. In some embodiments, LOH is determined in regions near or including MHC Class II genes. In some embodiments, LOH is determined in regions near or including MHC Class I and MHC Class II genes. In some embodiments, LOH is determined in regions of the B2M gene. In some embodiments, LOH is determined in regions of the B2M gene and in regions near or including MHC genes. In some embodiments, LOH is determined in regions of the B2M gene and in regions near or including MHC Class I genes. In some embodiments, LOH is determined in regions of the B2M gene and in regions near or including MHC Class II genes.

The present methods are useful with any available gene panel that provides the desired genes of interest, including the current version of the PGDx Elio™ tissue complete test. (personalgenome.com). Certain software updates are useful to analyze single nucleotide polymorphisms (SNPs) and copy number variation (CNV) to call regions of LOH in the target genes. Further, hybrid capture regions of interest (ROI) including MHC Class I genes can be added the PGDx Elio™ tissue complete panel.

The present methods can predict response to immunotherapies more accurately than TMB tests alone. Today, all high TMB patients are considered "likely" responders. Testing for somatic alterations of genes in the antigen presentation complex can be added to the current TMB test and identify patients as "likely" responders if they have both (1) High TMB, and (2) normal antigen presentation. This can change the diagnosis of patients in the upper right quadrant of Table 1 from good to poor outcome.

TABLE 1

TMB/LOH Status and Treatment Outcome

|  | No LOH | LOH |
|---|---|---|
| High TMB | Good Outcome | Poor Outcome (changed by LOH test) |
| Low TMB | Poor Outcome | Poor Outcome |

Loss of antigen presentation is a mechanism of immune evasion and the present methods show that the PGDx Elio™ tissue complete test or other PCR or NGS approaches, for example, can be used to identify LOH in these genes.

In some embodiments of the methods provided herein, a high TMB score in the absence of LOH is indicative of a good outcome, i.e., the patient will likely respond to immunotherapy. In some embodiments, a low TMB score in the absence of LOH is indicative of a poor outcome, i.e., the patient is less likely to respond to immunotherapy. In some embodiments, a low TMB score in the presence of LOH is indicative of a poor outcome, i.e., the patient is less likely to respond to immunotherapy. In some embodiments, a high TMB score in the presence of LOH is indicative of a poor outcome, i.e., the patient is less likely to respond to immunotherapy. In some embodiments, the immunotherapy is checkpoint inhibitor therapy.

As used herein, the terms "less likely to respond" or "less likely responder" refers to the response of a patient to treatment relative to a patient with a predicted good or positive outcome or response to treatment. In some embodiments, a "less likely responder" is 5%, 10%, 20%, 30%, 40%, 50%, 60%, 70%, 80%, 90%, 100%, or any number or range in between, less likely to respond to treatment than a patient with a predicted good or positive outcome or response to treatment. As used herein, "positive response to treatment" or "good response to treatment" can be used interchangeably with "treatment," as defined below. As used herein, the terms "likely to respond" or "likely responder" refer to the response of a patient to treatment relative to a patient with a predicted poor or negative outcome or response to treatment. In some embodiments, a "likely responder" is 5%, 10%, 20%, 30%, 40%, 50%, 60%, 70%, 80%, 90%, 100%, or any number or range in between, more likely to respond to treatment than a patient with a predicted poor or negative outcome or response to treatment. As used herein, the terms "poor outcome," "negative outcome," or "negative response" when referring to treatment of a patient means that the patient does not respond to treatment, i.e., the treatment is not effective, with "treatment" as defined below.

In some embodiments, the immunotherapy includes administration of a checkpoint inhibitor. Any checkpoint inhibitor can be used in the methods provided herein. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), Avelumab (BAVENCIO), Durvalumab (IMFINZI), or Ipilimumab (YERVOY).

Samples

In some embodiments, the methods provided herein include determination of tumor mutational burden (TMB) and loss of heterozygosity (LOH) in a sample from a patient with cancer. In some embodiments, the cancer is a tumor. Samples from both solid and liquid tumors can be used in the methods described herein. As used herein, the term "tumor" refers to a mass or lump of tissue that is formed by an accumulation of abnormal cells. A tumor can be benign (i.e., not cancer), malignant (i.e., cancer), or premalignant (i.e., precancerous). The terms "tumor" and "neoplasm" can be used interchangeably. Generally, a cancer that is a tumor is malignant.

As used herein, the term "solid tumor" refers to an abnormal mass of tissue that usually does not contain cysts or liquid areas. Exemplary solid tumors include sarcomas and carcinomas, for example. As used herein, the term "liquid tumors" refers to tumors or cancers present in body fluids such as blood and bone marrow. Exemplary liquid tumors include hematopoietic tumors, such as leukemias and lymphomas, notwithstanding the ability of lymphomas to grow as solid tumors by growing in a lymph node, for example. The term "liquid tumor" can be used interchangeably with the term "blood cancer," unless context clearly indicates otherwise.

A sample from any cancer can be analyzed by the methods provided herein. In some embodiments, the cancer is selected from breast, pancreatic, lung, melanoma, hematopoietic cancers and leukemias, colon, kidney, head and neck, brain, bone, ovarian, cervical cancer, endometrial cancer and prostate cancer. Accordingly, the patient of the methods provided herein may suffer from any cancer. In some embodiments, the cancer is a tumor. In some embodiments, the patient suffers from breast cancer, pancreatic cancer, lung cancer, melanoma, hematopoietic cancer, leukemia, colon cancer, kidney cancer, head and neck cancer, brain cancer, bone cancer, ovarian cancer, cervical cancer, endometrial cancer, or prostate cancer.

Any sample or type of sample can be used in the methods provided herein. In some embodiments, the sample is blood, saliva, plasma, serum, urine, or other biological fluid. Additional exemplary biological fluids include serosal fluid, lymph, cerebrospinal fluid, mucosal secretion, vaginal fluid, ascites fluid, pleural fluid, pericardial fluid, peritoneal fluid, abdominal fluid. In some embodiments, the sample is a tissue sample. In some embodiments, the sample is a tissue sample from a cancer. In some embodiments, the sample is a cell sample. In some embodiments, the sample is a cell sample from a cancer. In some embodiments, the sample is a cancer sample. A cancer sample can be a sample from a solid tumor or a liquid tumor.

MHC/B2M Genes

As described above, any gene or multiple genes can be analyzed for LOH in the methods provided herein. In some embodiments, LOH is determined in regions near or including MHC genes. Both MHC Class I and MHC Class II genes can be analyzed for LOH. In some embodiments, LOH is determined in regions near or including MHC Class I genes. In some embodiments, LOH is determined in regions near or including MHC Class II genes. In some embodiments, LOH is determined in regions near or including MHC Class I and MHC Class II genes. In some embodiments, LOH is determined in regions of the B2M gene. In some embodiments, LOH is determined in regions of the B2M gene and in regions near or including MHC genes. In some embodiments, LOH is determined in regions of the B2M gene and in regions near or including MHC Class I genes. In some embodiments, LOH is determined in regions of the B2M gene and in regions near or including MHC Class II genes.

Major histocompatibility complex (MHC) Class I and MHC Class II complex are the primary MHC molecules. MHC Class I molecules are found on the surface of all nucleated cells and on platelets. MHC Class I molecules function to display peptide fragments of proteins from within cells to cytotoxic T cells. Display of peptide fragments triggers an immune response against a non-self antigen or a neoantigen. Although MHC Class I molecules present peptides generated mainly from degradation of cytosolic proteins (cytosolic or endogenous pathway of presentation), class I MHC can also present peptides generated from exogenous proteins in a process referred to as cross-presentation.

MHC Class I molecules are heterodimers that include two polypeptide chains, α and β2-microglobulin (b2m), that are non-covalently linked. The α-chain is polymorphic and is encoded by a HLA gene in humans. The b2m subunit is not polymorphic an is encoded by the Beta-2 microglobulin (B2M gene).

Figure 7:
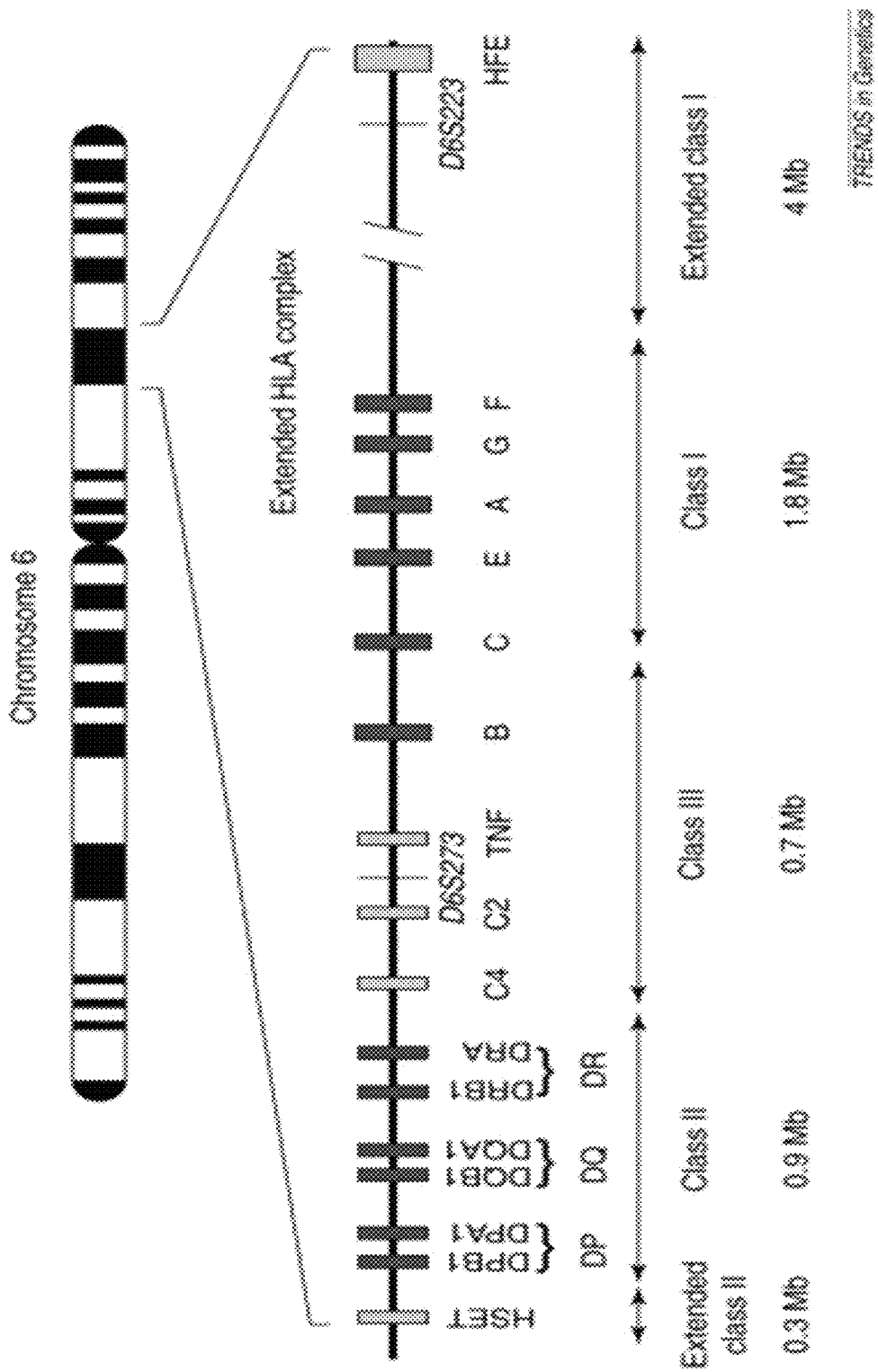
FIG. 7 shows the MHC region on chromosome 6p21.

As used herein, the term "MHC class I gene" refers to genes encoding the α-subunit of MHC Class I molecules. Genes encoding the α-subunit of MHC Class I molecules are part of the human leukocyte antigen (HLA) gene complex that resides on a gene stretch of about 3 Mbp on chromosome 6p21 (FIG. 7). The HLA gene complex also includes genes that encode Class II MHC molecules. MHC Class II molecules are normally found on professional antigen-presenting cells, such as dendritic cells, mononuclear phagocytes, some endothelial cells, thymic epithelial cells, and B cells, for example. Exemplary genes encoding the α-subunit of MHC Class I molecules include the highly polymorphic HLA-A, HLA-B, and HLA-C genes. Additional exemplary genes encoding the α-subunit include HLA-E, HLA-F, and HLA-G, and the pseudogenes HLA-K and HLA-L. Exemplary genes encoding Class II MHC molecules include the HLA-DM, HLA-DO, HLA-DP, HLA-DQ, and HLA-DR genes.

As used herein, the term "B2M gene" refers to genes encoding the β2-microglobulin (b2m) chain. The human B2M gene is located on the long arm of chromosome 15 at position 21.1.

In some embodiments, the methods provided herein include determining LOH in regions near or including the MHC Class I genes. In some embodiments, the methods provided herein include LOH in regions near or including the MHC Class I genes.

In some embodiments, the methods provided herein include determining LOH in regions of the B2M gene. In some embodiments, the methods provided herein include LOH in regions of the B2M gene.

In some embodiments, the methods provided herein include determining LOH in regions near or including the MHC Class I genes and in regions of the B2M gene. In some embodiments, LOH is in regions near or including MHC Class I genes and in regions of the B2M gene.

As used herein, the term "regions near a gene" or "regions near genes" refers to locations within 10 bp, 20 bp, 30 bp, 40 bp, 50 bp, 60 bp, 70 bp, 80 bp, 90 bp, 100 bp, 200 bp, 300 bp, 400 bp, 500 bp, 600 bp, 700 bp, 800 bp, 900 bp, 1,000 bp, 1,100 bp, 1,200 bp, 1,300 bp, 1,400 bp, 1,500 bp, 1,600 bp, 1,700 bp, 1,800 bp, 1,900 bp, 2,000 bp, 2,100 bp, 2,200 bp, 2,300 bp, 2,400 bp, 2,500 bp, 2,600 bp, 2,700 bp, 2,800 bp, 2,900 bp, 3,000 bp, 3,100 bp, 3,200 bp, 3,300 bp, 3,400 bp, 3,500 bp, 3,600 bp, 3,700 bp, 3,800 bp, 3,900 bp, 4,000 bp, 4,100 bp, 4,200 bp, 4,300 bp, 4,400 bp, 4,500 bp, 4,600 bp, 4,700 bp, 4,800 bp, 4,900 bp, 5,000 bp, 5,500 bp, 6,000 bp, 6,500 bp, 7,000 bp, 7,500 bp, 8,000 bp, 8,500 bp, 9,000 bp, 9,500 bp, 10,000 bp, 11,000 bp, 12,000 bp, 13,000 bp, 14,000 bp, 15,000, 16,000 bp, 17,000 bp, 18,000 bp, 19,000 bp, 20,000 bp, 25,000 bp, 30,000 bp, 35,000 bp, 40,000 bp, 45,000 bp, 50,000 bp, 55,000 bp, 60,000 bp, 65,000 bp, 70,000 bp, 75,000 bp, 80,000 bp, 85,000 bp, 90,000 bp, 95,000 bp, 100,000 bp, and any number or range in between, of a gene, a gene within a gene cluster, or the gene cluster itself.

As used herein, the term "regions of a gene" refers to any location within a region of DNA that controls a hereditary characteristic or within a functional unit of heredity, including genes coding for protein and RNA, and pseudogenes. A region of a gene can include any location within the entire functional unit, including coding sequences, non-coding sequences such as introns and untranslated sequences, for example, and non-coding regulatory sequences, such as promoters, enhancers, and insulators, for example. A "region of a gene" can include any number of basepairs (bp).

Neoantigens

In some embodiments, tumor mutations in the methods provided herein include a neoantigen or neoepitope recognized by a T cell. In some embodiments, a neoantigen or neoepitope is a tumor antigen or tumor epitope. Exemplary tumor antigens include products of mutated oncogenes, products or mutated tumor suppressor genes, products of mutated genes other than oncogenes or tumor suppressors, tumor antigens produced by oncogenic viruses, altered cell surface glycolipids and glycoproteins, oncofetal antigens, and others.

A neoantigen or neoepitope can be any newly formed antigen or epitope that has not been previously recognized by the immune system. Thus, a neoantigen or neoepitope can be recognized by the immune system as non-self, eliciting an immune response. Neoantigens and neoepitopes can arise from altered tumor proteins as a result of mutations, as detailed above, or from viral proteins, for example. In some embodiments, a viral protein can give rise to neoantigens or neoepitopes, including viral proteins from hepatitis B virus (HBV), hepatitis C virus (HCV), Epstein-Barr virus (EBV), human papillomavirus (HPV), human T-lymphotrophic virus (HTLV), Kaposi's sarcoma-associated herpesvirus (KSHV), Merkel cell polyomavirus, or any other tumor virus, for example.

Exome Sequencing

In some embodiments, the methods provided herein include determining in a sample from a patient with cancer the tumor mutation burden (TMB) and loss of heterozygosity (LOH) by sequencing one or more exomes from the sample, or regions thereof. As used herein, the term "exome" refers to the part of the genome composed of exons. The exome can include all DNA regions that are transcribed into mature RNA in cells of any type. The human exome includes about 180,000 exons, constituting about 1% of the human genome, or approximately 30 million base pairs of DNA.

As used herein, the term "exome sequencing" refers to sequencing all protein coding exons of genes in a genome. Exome sequencing can include target enrichment methods such as array-based capture and in-solution capture of nucleic acid, for example. Any sequencing method can be used, including Sanger sequencing using labeled terminators or primers and gel separation in slab or capillary systems, and Next Generation Sequencing (NGS). Exemplary Next Generation Sequencing methodologies include the Roche 454 sequencer, Life Technologies SOLiD systems, the Life Technologies Ion Torrent, and Illumina systems such as the Illumina Genome Analyzer II, Illumina MiSeq, Illumina Hi Seq, and Illumina NovaSeq instruments.

Methods for Determining Therapeutic Regimens

In some embodiments, provided herein are methods of determining a therapeutic regimen in a patient with cancer comprising determining in a sample from the patient the tumor mutation burden (TMB) and loss of heterozygosity (LOH), wherein high TMB in combination with no LOH is indicative of a positive outcome when treated with a checkpoint inhibitor and high TMB with LOH is indicative of a poor outcome. In some embodiments, low TMB in combination with no LOH is indicative of a poor outcome when treated with a checkpoint inhibitor. In some embodiments, low TMB in combination with LOH is indicative of a poor outcome when treated with a checkpoint inhibitor.

In some embodiments, the cancer is a tumor. A patient for whom a therapeutic regimen is determined, as described herein, may have any type of cancer, including but not limited to breast cancer, pancreatic cancer, lung cancer, melanoma, hematopoietic cancer, leukemia, colon cancer, kidney cancer, head and neck cancer, brain cancer, bone cancer, ovarian cancer, cervical cancer, and prostate cancer. Similarly, a patient for whom a therapeutic regimen is determined, as described herein, may have any type of tumor, including a solid tumor or a liquid tumor, as detailed above.

In some embodiments, the sample for use in the methods provided herein is a sample from a solid tumor or a liquid tumor. In some embodiments, the sample is a cancer sample. A tumor or cancer sample can include both cancer or tumor cells and normal, i.e., non-malignant, cells. A sample from any cancer or tumor can be used or analyzed in the methods provided herein, including samples from breast, pancreatic, lung, melanoma, hematopoietic cancers and leukemias, colon, kidney, head and neck, brain, bone, ovarian, cervical and prostate cancer, and samples from solid or liquid tumors.

Any type of sample can be used in the methods provided herein. In some embodiments, the sample is from blood, saliva, plasma, serum, urine, or other biological fluid. Additional exemplary biological fluids include serosal fluid, lymph, cerebrospinal fluid, mucosal secretion, vaginal fluid, ascites fluid, pleural fluid, pericardial fluid, peritoneal fluid, abdominal fluid. In some embodiments, the sample is a tissue sample. In some embodiments, the sample is a tissue sample from a cancer. In some embodiments, the sample is a cell sample. In some embodiments, the sample is a cell sample from a cancer. In some embodiments, the sample is a cancer sample.

In some embodiments, the methods provided herein include determining loss of heterozygosity (LOH). LOH can be determined for any gene encoding proteins of an antigen presenting complex. In some embodiments, LOH is determined for genes of the MHC Class I complex. In some embodiments, LOH is determines for genes of the MHC Class II complex. In some embodiments, LOH is determined in regions near or including MHC Class I genes. In some embodiments, LOH is determined in regions of the B2M gene. In some embodiments, LOH is determined in regions near or including MHC Class I genes and in regions of the B2M gene. LOH can be in any combination of genes, including combinations of MHC Class I, MHC Class II, and B2M genes.

In some embodiments, high TMB in combination with no LOH is indicative of a positive outcome when treated with a checkpoint inhibitor and high TMB with LOH is indicative of a poor outcome. The methods provided herein contemplate use, selection of, or treatment with any immunotherapy. In some embodiments, the immunotherapy is treatment with a checkpoint inhibitor. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY).

In some embodiments, determining the tumor mutation burden (TMB) and loss of heterozygosity (LOH) in a sample from a patient includes sequencing one or more exomes from the sample, or regions thereof. As detailed above, exome sequencing can include target enrichment methods such as array-based capture and in-solution capture of nucleic acid, for example. Any sequencing method can be used, including Sanger sequencing using labeled terminators or primers and gel separation in slab or capillary systems, and Next Generation Sequencing (NGS). Exemplary Next Generation Sequencing methodologies include the Roche 454 sequencer, Life Technologies SOLiD systems, the Life Technologies Ion Torrent, and Illumina systems such as the Illumina Genome Analyzer II, Illumina MiSeq, Illumina Hi Seq, and Illumina NovaSeq instruments.

Tumor mutations generally contribute to TMB. In some embodiments, tumor mutations include a neoantigen or neopepitope recognized by a T cell. In some embodiments, a neoantigen or neoepitope is a tumor antigen or tumor epitope. Exemplary tumor antigens include products of mutated oncogenes, products or mutated tumor suppressor genes, products of mutated genes other than oncogenes or tumor suppressors, tumor antigens produced by oncogenic viruses, altered cell surface glycolipids and glycoproteins, oncofetal antigens, and others.

A neoantigen or neoepitope can be any newly formed antigen or epitope that has not been previously recognized by the immune system. Thus, a neoantigen or neoepitope can be recognized by the immune system as non-self, eliciting an immune response. Neoantigens and neoepitopes can arise from altered tumor proteins as a result of mutations, as detailed above, or from viral proteins, for example. In some embodiments, a viral protein can give rise to neoantigens or neoepitopes, including viral proteins from hepatitis B virus (HBV), hepatitis C virus (HCV), Epstein-Barr virus (EBV), human papillomavirus (HPV), human T-lymphotrophic virus (HTLV), Kaposi's sarcoma-associated herpesvirus (KSHV), Merkel cell polyomavirus, or any other tumor virus, for example.

Methods of Patient Selection

Provided herein, in some embodiments, are methods of selecting a patient with cancer for treatment with a checkpoint inhibitor comprising selecting the patient for treatment with the checkpoint inhibitor when TMB is high in the absence of LOH in a sample obtained from the patient. In some embodiments, high TMB in combination with no LOH is indicative of a positive outcome when treated with the checkpoint inhibitor and high TMB with LOH is indicative of a poor outcome. In some embodiments, low TMB in combination with no LOH is indicative of a poor outcome when treated with a checkpoint inhibitor. In some embodiments, low TMB in combination with LOH is indicative of a poor outcome when treated with a checkpoint inhibitor.

In some embodiments, the cancer is a tumor. A patient selected for treatment according to the methods provided herein may have any type of cancer, including but not limited to breast cancer, pancreatic cancer, lung cancer, melanoma, hematopoietic cancer, leukemia, colon cancer, kidney cancer, head and neck cancer, brain cancer, bone cancer, ovarian cancer, cervical cancer, and prostate cancer. Similarly, a patient selected for treatment according to the methods provided herein may have any type of tumor, including a solid tumor or a liquid tumor, as detailed above.

In some embodiments, the sample for use in the methods provided herein is a sample from a solid tumor or a liquid tumor. In some embodiments, the sample is a cancer sample. A tumor or cancer sample can include both cancer or tumor cells and normal, i.e., non-malignant, cells. A sample from any cancer or tumor can be used or analyzed in the methods provided herein, including samples from breast, pancreatic, lung, melanoma, hematopoietic cancers and leukemias, colon, kidney, head and neck, brain, bone, ovarian, cervical and prostate cancer, and samples from solid or liquid tumors.

Any type of sample can be used in the methods provided herein. In some embodiments, the sample is from blood, saliva, plasma, serum, urine, or other biological fluid. Additional exemplary biological fluids include serosal fluid, lymph, cerebrospinal fluid, mucosal secretion, vaginal fluid, ascites fluid, pleural fluid, pericardial fluid, peritoneal fluid, abdominal fluid. In some embodiments, the sample is a tissue sample. In some embodiments, the sample is a tissue sample from a cancer. In some embodiments, the sample is a cell sample. In some embodiments, the sample is a cell sample from a cancer. In some embodiments, the sample is a cancer sample.

In some embodiments, the methods provided herein include loss of heterozygosity (LOH). LOH can be in any gene encoding proteins of an antigen presenting complex. In some embodiments, LOH is in genes of the MHC Class I complex. In some embodiments, LOH is in genes of the MHC Class II complex. In some embodiments, LOH is in regions near or including MHC Class I genes. In some embodiments, LOH is in regions of the B2M gene. In some embodiments, LOH is in regions near or including MHC Class I genes and in regions of the B2M gene. LOH can be in any combination of genes, including combinations of MHC Class I, MHC Class II, and B2M genes.

In some embodiments, high TMB in combination with no LOH is indicative of a positive outcome when treated with a checkpoint inhibitor and high TMB with LOH is indicative of a poor outcome. The methods provided herein contemplate use, selection of, or treatment with any immunotherapy. In some embodiments, the immunotherapy is treatment with a checkpoint inhibitor. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY).

In some embodiments, determining tumor mutational burden (TMB) and loss of heterozygosity (LOH) in a sample from a patient includes sequencing one or more exomes from the sample, or regions thereof. As detailed above, exome sequencing can include target enrichment methods such as array-based capture and in-solution capture of nucleic acid, for example. Any sequencing method can be used, including Sanger sequencing using labeled terminators or primers and gel separation in slab or capillary systems, and Next Generation Sequencing (NGS). Exemplary Next Generation Sequencing methodologies include the Roche 454 sequencer, Life Technologies SOLiD systems, the Life Technologies Ion Torrent, and Illumina systems such as the Illumina Genome Analyzer II, Illumina MiSeq, Illumina Hi Seq, and Illumina NovaSeq instruments. Any sample described herein can be analyzed for TMB and LOH to select a patient for treatment.

Tumor mutations generally contribute to TMB. In some embodiments, tumor mutations include a neoantigen or neopepitope recognized by a T cell. In some embodiments, a neoantigen or neoepitope is a tumor antigen or tumor epitope. Exemplary tumor antigens include products of mutated oncogenes, products or mutated tumor suppressor genes, products of mutated genes other than oncogenes or tumor suppressors, tumor antigens produced by oncogenic viruses, altered cell surface glycolipids and glycoproteins, oncofetal antigens, and others.

A neoantigen or neoepitope can be any newly formed antigen or epitope that has not been previously recognized by the immune system. Thus, a neoantigen or neoepitope can be recognized by the immune system as non-self, eliciting an immune response. Neoantigens and neoepitopes can arise from altered tumor proteins as a result of mutations, as detailed above, or from viral proteins, for example. In some embodiments, a viral protein can give rise to neoantigens or neoepitopes, including viral proteins from hepatitis B virus (HBV), hepatitis C virus (HCV), Epstein-Barr virus (EBV), human papillomavirus (HPV), human T-lymphotrophic virus (HTLV), Kaposi's sarcoma-associated herpesvirus (KSHV), Merkel cell polyomavirus, or any other tumor virus, for example.

Methods of Treatment

In some embodiments, provided herein are methods of treating a patient with cancer comprising: (i) selecting the patient for treatment with a checkpoint inhibitor when TMB is high in the absence of LOH in a sample obtained from the patient; and (ii) administering to the patient an effective amount of the checkpoint inhibitor. In some embodiments, high TMB in combination with no LOH is indicative of a positive outcome when treated with a checkpoint inhibitor and high TMB with LOH is indicative with a poor outcome. In some embodiments, low TMB in combination with no LOH is indicative of a poor outcome when treated with a checkpoint inhibitor. In some embodiments, low TMB in combination with LOH is indicative of a poor outcome when treated with a checkpoint inhibitor.

In some embodiments, the cancer is a tumor. A patient treated according to the methods provided herein may have any type of cancer, including but not limited to breast cancer, pancreatic cancer, lung cancer, melanoma, hematopoietic cancer, leukemia, colon cancer, kidney cancer, head and neck cancer, brain cancer, bone cancer, ovarian cancer, cervical cancer, and prostate cancer. Similarly, a patient treated according to the methods provided herein may have any type of tumor, including a solid tumor or a liquid tumor, as detailed above.

In some embodiments, the sample for use in the methods provided herein is a sample from a solid tumor or a liquid tumor. In some embodiments, the sample is a cancer sample. A tumor or cancer sample can include both cancer or tumor cells and normal, i.e., non-malignant, cells. A sample from any cancer or tumor can be used or analyzed in the methods provided herein, including samples from breast, pancreatic, lung, melanoma, hematopoietic cancers and leukemias, colon, kidney, head and neck, brain, bone, ovarian, cervical and prostate cancer, and samples from solid or liquid tumors.

Any type of sample can be used in the methods provided herein. In some embodiments, the sample is from blood, saliva, plasma, serum, urine, or other biological fluid. Additional exemplary biological fluids include serosal fluid, lymph, cerebrospinal fluid, mucosal secretion, vaginal fluid, ascites fluid, pleural fluid, pericardial fluid, peritoneal fluid, abdominal fluid. In some embodiments, the sample is a tissue sample. In some embodiments, the sample is a tissue sample from a cancer. In some embodiments, the sample is a cell sample. In some embodiments, the sample is a cell sample from a cancer. In some embodiments, the sample is a cancer sample.

In some embodiments, the methods provided herein include loss of heterozygosity (LOH). LOH can be determined for any gene encoding proteins of an antigen presenting complex. In some embodiments, LOH is in genes of the MHC Class I complex. In some embodiments, LOH is in genes of the MHC Class II complex. In some embodiments, LOH is in regions near or including MHC Class I genes. In some embodiments, LOH is in regions of the B2M gene. In some embodiments, LOH is in regions near or including MHC Class I genes and in regions of the B2M gene.

In some embodiments, high TMB in combination with no LOH is indicative of a positive outcome when treated with a checkpoint inhibitor and high TMB with LOH is indicative of a poor outcome. The methods provided herein contemplate use, selection of, or treatment with any immunotherapy. In some embodiments, the immunotherapy is treatment with a checkpoint inhibitor. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY). Accordingly, a patient can be selected for treatment with any checkpoint inhibitor described herein, and an effective amount of any checkpoint inhibitor can be administered to the patient. In some embodiments, the checkpoint inhibitor is Pembrolizumab (KEYTRUDA), Nivolumab (OPDIVO), Atezolizumab (TECENTRIQ), Avelumab (BAVENCIO), Durvalumab (IMFINZI), Avelumab (BAVENCIO), Durvalumab (IMFINZI), or Ipilimumab (YERVOY).

In some embodiments, determining tumor mutational burden (TMB) and loss of heterozygosity (LOH) in a sample from a patient includes sequencing one or more exomes from the sample, or regions thereof. As detailed above, exome sequencing can include target enrichment methods such as array-based capture and in-solution capture of nucleic acid, for example. Any sequencing method can be used, including Sanger sequencing using labeled terminators or primers and gel separation in slab or capillary systems, and Next Generation Sequencing (NGS). Exemplary Next Generation Sequencing methodologies include the Roche 454 sequencer, Life Technologies SOLiD systems, the Life Technologies Ion Torrent, and Illumina systems such as the Illumina Genome Analyzer II, Illumina MiSeq, Illumina Hi Seq, and Illumina NovaSeq instruments.

Tumor mutations generally contribute to TMB. In some embodiments, tumor mutations include a neoantigen or neopepitope recognized by a T cell. In some embodiments, a neoantigen or neoepitope is a tumor antigen or tumor epitope. Exemplary tumor antigens include products of mutated oncogenes, products of mutated tumor suppressor genes, products of mutated genes other than oncogenes or tumor suppressors, tumor antigens produced by oncogenic viruses, altered cell surface glycolipids and glycoproteins, oncofetal antigens, and others.

A neoantigen or neoepitope can be any newly formed antigen or epitope that has not been previously recognized by the immune system. Thus, a neoantigen or neoepitope can be recognized by the immune system as non-self, eliciting an immune response. Neoantigens and neoepitopes can arise from altered tumor proteins as a result of mutations, as detailed above, or from viral proteins, for example. In some embodiments, a viral protein can give rise to neoantigens or neoepitopes, including viral proteins from hepatitis B virus (HBV), hepatitis C virus (HCV), Epstein-Barr virus (EBV), human papillomavirus (HPV), human T-lymphotrophic virus (HTLV), Kaposi's sarcoma-associated herpesvirus (KSHV), Merkel cell polyomavirus, or any other tumor virus, for example.

As used herein, the terms "treat," "treatment," "therapy," "therapeutic," and the like refer to obtaining a desired pharmacologic and/or physiologic effect, including, but not limited to, alleviating, delaying or slowing the progression, reducing the effects or symptoms, preventing onset, inhibiting, ameliorating the onset of a diseases or disorder, obtaining a beneficial or desired result with respect to a disease, disorder, or medical condition, such as a therapeutic benefit and/or a prophylactic benefit. "Treatment," as used herein, covers any treatment of a disease in a mammal, particularly in a human, and includes: (a) preventing the disease from occurring in a subject which may be predisposed to the disease or at risk of acquiring the disease but has not yet been diagnosed as having it; (b) inhibiting the disease, i.e., arresting its development; and (c) relieving the disease, i.e., causing regression of the disease. A therapeutic benefit includes eradication or amelioration of the underlying disorder being treated. Also, a therapeutic benefit is achieved with the eradication or amelioration of one or more of the physiological symptoms associated with the underlying disorder such that an improvement is observed in the subject, notwithstanding that the subject may still be afflicted with the underlying disorder. In some cases, for prophylactic benefit, treatment or compositions for treatment are administered to a subject at risk of developing a particular disease, or to a subject reporting one or more of the physiological symptoms of a disease, even though a diagnosis of this disease may not have been made. The methods of the present disclosure may be used with any mammal or other animal. In some cases, the treatment can result in a decrease or cessation of symptoms. A prophylactic effect includes delaying or eliminating the appearance of a disease or condition, delaying or eliminating the onset of symptoms of a disease or condition, slowing, halting, or reversing the progression of a disease or condition, or any combination thereof.

As used herein, the term "effective amount" or "therapeutically effective amount" refers to that amount of a checkpoint inhibitor or other composition described herein that is sufficient to affect the intended application, including but not limited to disease treatment, as defined herein. The therapeutically effective amount may vary depending upon the intended treatment application (in vivo), or the patient and disease condition being treated, e.g., the weight and age of the patient, the severity of the disease condition, the manner of administration and the like, which can readily be determined by one of ordinary skill in the art. The term also applies to a dose that will induce a particular response in a target cell. The specific dose will vary depending on the particular checkpoint inhibitor or other composition chosen, the dosing regimen to be followed, whether it is administered in combination with other compounds, timing of administration, the tissue to which it is administered, and the physical delivery system in which it is carried.

The methods of treatment provided herein can include treating any cancer. Exemplary cancers include breast, pancreatic, lung, melanoma, hematopoietic cancers and leukemias, colon, kidney, head and neck, brain, bone, ovarian, cervical and prostate cancer, as detailed above. Further, any sample described herein can be analyzed for TMB and LOH to select a patient for treatment.

Computing Devices

As one skilled in the art recognizes as necessary or best-suited, performance of the methods provided herein may include one or more computing devices, computing systems, or computers that include one or more of a processor (e.g., a central processing unit (CPU), a graphics processing unit (GPU), etc.), a computer-readable storage device (e.g., main memory, static memory, etc.), or combinations thereof which communicate with each other via a bus.

A processor may include any suitable processor known in the art, such as the processor sold under the trademark XEON E7 by Intel (Santa Clara, Calif.) or the processor sold under the trademark OPTERON 6200 by AMD (Sunnyvale, Calif.).

Memory preferably includes at least one tangible, non-transitory medium capable of storing: one or more sets of instructions executable to cause the system to perform functions described herein (e.g., software embodying any methodology or function found herein or computer programs referred to above); data (e.g., images of sources of medication data, personal data, or a database of medications); or both. While the computer-readable storage device can, in an exemplary embodiment, be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, and any other tangible storage media.

Any suitable services can be used for storage such as, for example, Amazon Web Services, memory of the computing system, cloud storage, a server, or other computer-readable storage.

Input/output devices according to the methods provided herein may include one or more of a display unit (e.g., a liquid crystal display (LCD) or a cathode ray tube (CRT) monitor), an alphanumeric input device (e.g., a keyboard), a cursor control device (e.g., a mouse or trackpad), a disk drive unit, a printer, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof.

One of skill in the art will recognize that any suitable development environment or programming language may be employed to implement the methods described herein. For example, methods herein can be implemented using Perl, Python, C++, C#, Java, JavaScript, Visual Basic, Ruby on Rails, Groovy and Grails, or any other suitable tool. For a mobile device, it may be preferred to use native xCode or Android Java.

As used herein, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

"About" as used herein when referring to a measurable value such as an amount, a temporal duration, and the like, is meant to encompass variations of ±20%, or ±10%, or ±5%, or even ±1% from the specified value, as such variations are appropriate for the disclosed methods or to perform the disclosed methods. The term "about" can be used interchangeably with the term "approximately," unless clearly contradicted by context.

Unless defined otherwise, all technical and scientific terms used herein have the same meaning as is commonly understood by one of skill in the art to which this invention belongs.

As used herein, the term "protein" refers to any polymeric chain of amino acids. The terms "peptide" and "polypeptide" are used interchangeably with the term "protein" and also refer to a polymeric chain of amino acids. The term "protein" encompasses native or artificial proteins, protein fragments and polypeptide analogs of a protein sequence. A protein may be monomeric or polymeric. The term "protein" encompasses fragments and variants (including fragments of variants) thereof, unless otherwise contradicted by context.

As used herein, the term "nucleic acid" refers to any deoxyribonucleic acid (DNA) molecule, ribonucleic acid (RNA) molecule, or nucleic acid analogues. A DNA or RNA molecule can be double-stranded or single-stranded and can be of any size. Exemplary nucleic acids include, but are not limited to, chromosomal DNA, plasmid DNA, cDNA, cell-free DNA (cfDNA), mRNA, tRNA, rRNA, siRNA, micro RNA (miRNA or miR), hnRNA. Exemplary nucleic analogues include peptide nucleic acid, morpholino- and locked nucleic acid, glycol nucleic acid, and threose nucleic acid.

As used herein, the term "patient" refers to any individual or subject on which the methods disclosed herein are performed. The term "patient" can be used interchangeably with the term "individual" or "subject." The patient can be a human, although the patient may be an animal, as will be appreciated by those in the art. Thus, other animals, including mammals such as rodents (including mice, rats, hamsters and guinea pigs), cats, dogs, rabbits, farm animals including cows, horses, goats, sheep, pigs, etc., and primates (including monkeys, chimpanzees, orangutans and gorillas) are included within the definition of patient.

As used herein, the terms "sample" and "biological sample" refer to any sample suitable for the methods provided herein. A sample used in the present methods can be obtained from tissue samples or bodily fluid from a subject, or tissue obtained by a biopsy procedure (e.g., a needle biopsy) or a surgical procedure. In certain embodiments, the biological sample of the present methods is a sample of bodily fluid, e.g., cerebrospinal fluid (CSF), blood, serum, plasma, urine, saliva, tears, and ascites, for example. A sample of bodily fluid can be collected by any suitable method known to a person of skill in the art.

The following patent applications provide background teachings for the invention and are herein incorporated by reference in their entirety: PCT/US2017/052908, PCT/US2015/062208, PCT/US2017/038942, PCT/US2017/056557, PCT/US2018/013637, PCT/US2016/042288, US20180064793A1, US20180251553A1, US20170016075A1, EP3288581A1 and EP3347039A1.

Materials and Methods for Examples

In heterogenous samples, consisting of a mix of tumor and normal cells, the heterozygous sites in regions affected by loss of heterozygosity (LOH) in the tumor fraction are generally reported as having allele frequencies (AF) higher than 50%, instead of the expected 50% AF, for example. Without being limited by theory, HLA are notoriously difficult to sequence via hybrid capture due to high variability in the general population. The methods provided herein circumvent this difficulty by leveraging the deviations from 50% AF values for heterozygous sites in the vicinity of HLA Class I for the detection of LOH.

Without being limited by theory, actual AF of heterozygous sites in regions with LOH varies according to tumor purity of the sample as represented by percentage of tumor cells, for example: samples with high tumor purity have AF with relatively higher deviations from 50%, samples with low tumor purity generally present a relatively lower deviation. Allele frequencies can also be impacted by allele specific copy number alterations. The methods provided herein apply corrections and normalizations based on the tumor purity estimate of the sample and potential copy number alterations to increase the accuracy of detection of LOH on HLA Class I.

A reference set to evaluate the accuracy of the algorithm that was developed (e.g., Example 1, below) was defined by sequencing and analyzing exome data of 226 non-small-cell lung cancer (NSCLC) formalin-fixed paraffin-embedded (FFPE) specimens and the corresponding matched normal sample. The algorithm was trained using PGDx Elio™ tissue complete assay (PGDx ETC) (targeting >500 genes and covering 1.3 Mb) to measure TMB and potential antigen presentation (LOH of MHC) in the same assay. 20 out of the 226 samples were used for training. Results were validated with the remaining 206 samples.

Example 1

This example describes training of an algorithm for analysis of TMB and LOH.

Figure 2A:
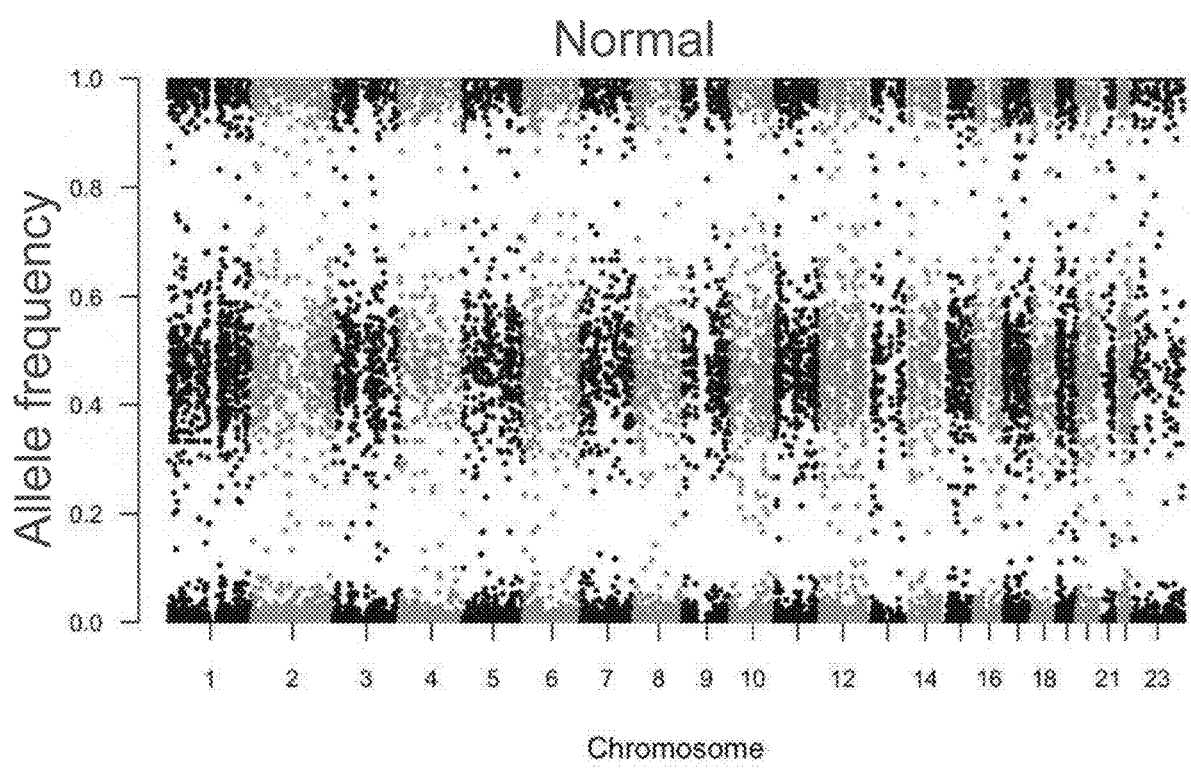
FIGS. 2A-2B show analysis of allele frequency across chromosomal loci to detect MHC heterozygosity.
Figure 2B:
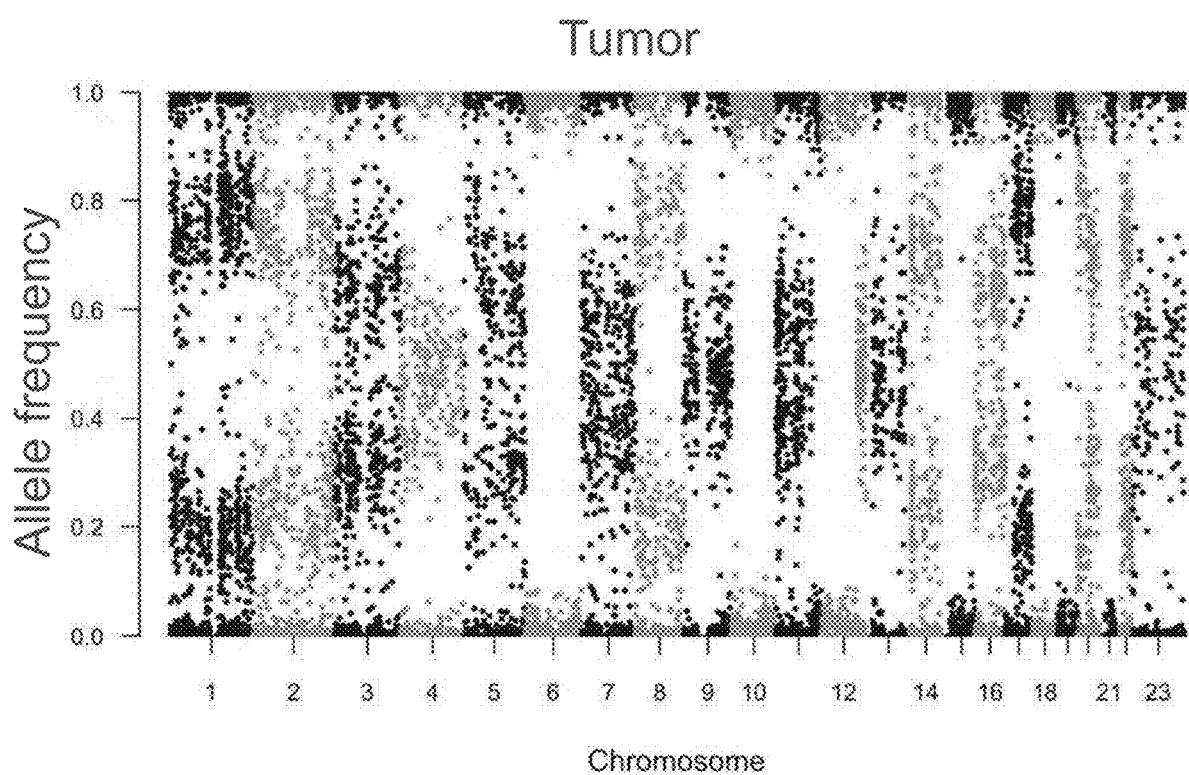

As described above (Materials and Methods), an algorithm was developed to determine LOH of the MHC Class I (LOH of MHC) using the PGDx Elio™ tissue complete assay, a tissue-based genomic profiling assay that targets >500 genes. A reference set to evaluate the accuracy of the algorithm was defined by sequencing and analyzing exome datasets from 226 non-small-cell lung cancer (NSCLC) formalin-fixed paraffin-embedded (FFPE) specimens and the corresponding matched normal sample (FIG. 2A and FIG. 2B).

The algorithm was initially trained using PGDx elio tissue complete for a subset of 20 of the 226 samples and then validated using the data associated with the remaining 206 samples.

The data show that LOH of chromosome 6 (MHC), 10, 12 (LOH of long arm only), 15 (B2M), 18, 19, and 21 was detected by the analysis of the allele frequency of polymorphic sites reported by the exome sequencing of tumor and normal samples from the same individual.

Example 2

This example describes correlation of LOH-MHC detection between WES and PGDx Elio™ tissue complete.

Agreement between predicted LOH of MHC as reported by PGDx Elio™ tissue complete and the observed LOH of MHC based on exome sequencing of the same sample is shown in Table 2 below.

TABLE 2

Correlation of LOH MHC detection between WES and PGDx elio ™ tissue complete (206 samples).

| | | All Tumor Purities Exome sequencing | | Tumor Purity >35% Exome sequencing | |
|---|---|---|---|---|---|
| | | LOH MHC | Normal MHC | LOH MHC | Normal MHC |
| PGDx elio tissue complete | LOH MHC | 48 | 8 | 37 | 0 |
| | Normal MHC | 17 | 133 | 5 | 44 |
| PPA (%; 95% CI) | | 74% (61-84%) | | 88% (74-96%) | |
| NPA (%; 95% CI) | | 95% (89-98%) | | 100% (92-100%) | |
| OPA (%; 95% CI) | | 88% | | 94% | |

PGDx Elio™ tissue complete had an overall agreement of 88% with the reference set of exome-based sequence analysis of 206 NSCLC samples in determining LOH of MHC (Table 2). When considering only samples with tumor purity higher than 35% (n=86) the overall agreement increased to 94%. PPA: positive percent agreement; NPA: negative percent agreement; OPA: overall percent agreement; CI: confidence interval.

Figure 3A:
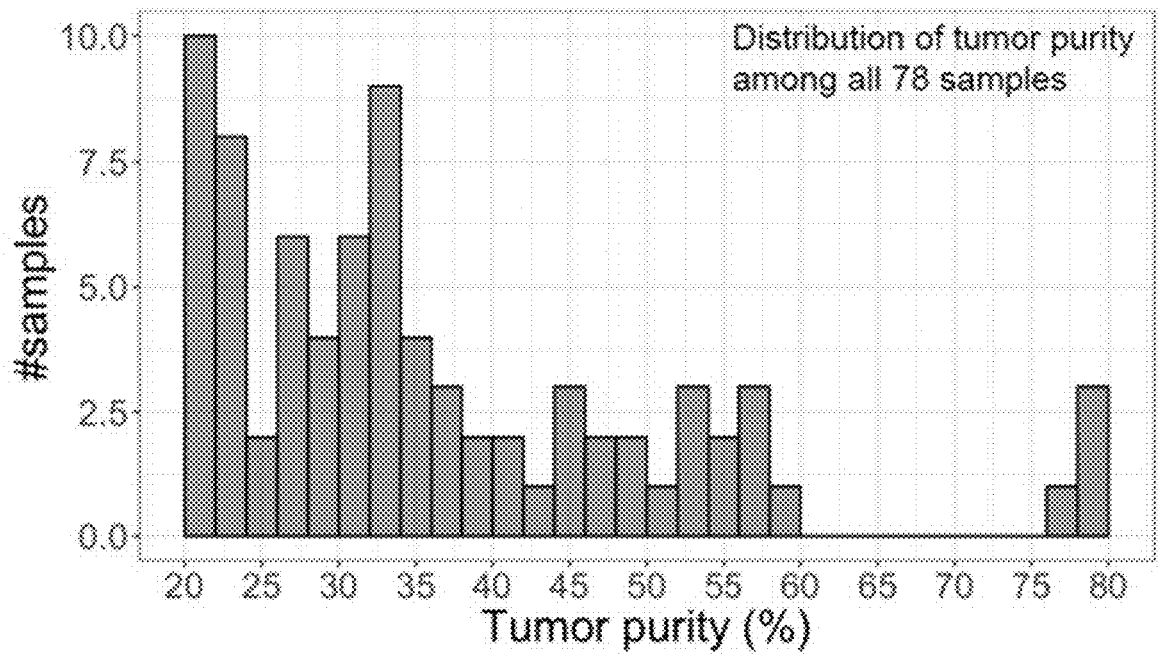
FIG. 3A shows distribution of the tumor purity of specimens used in the validation of method that detects LOH of MHC Class I.
Figure 3B:
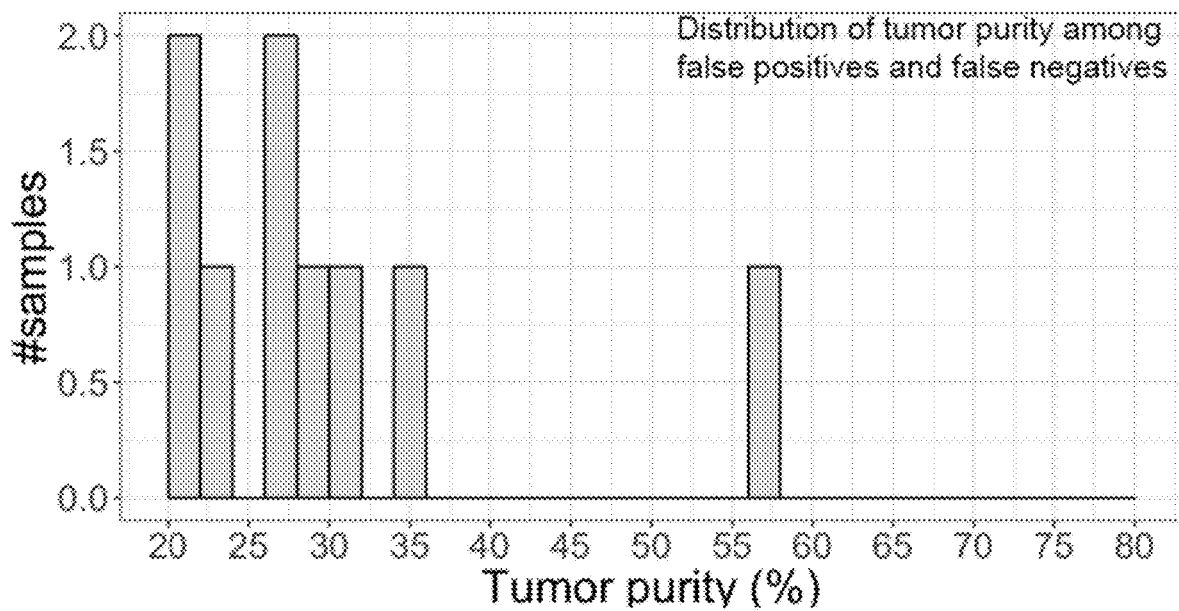
FIG. 3B shows analysis of tumor purity in samples with non-concordant MHC status between whole exome sequencing (WES) and PGDx Elio™ tissue complete (Wolverine).

Results of analysis of 78 NSCLC samples and distributions of tumor purity for 78 samples are shown in Table 3 and FIGS. 3A-B, respectively.

TABLE 3

Correlation of LOH MHC detection between WES and PGDx elio ™ tissue complete (78 samples).

| | | All Tumor Purities Exome sequencing | | Tumor Purity >35% Exome sequencing | |
|---|---|---|---|---|---|
| | | LOH MHC | Normal MHC | LOH MHC | Normal MHC |
| PGDx elio tissue complete | LOH MHC | 16 | 3 | 13 | 0 |
| | Normal MHC | 6 | 53 | 1 | 17 |
| PPA (%; 95% CI) | | 73% (50-89%) | | 88% (66-99%) | |
| NPA (%; 95% CI) | | 95% (85-99%) | | 100% (80-100%) | |
| OPA (%; 95% CI) | | 88% | | 97% | |

PGDx Elio™ tissue complete had an overall agreement of 88% with the reference set of exome-based analysis of 78 NSCLC samples in determining LOH of MHC (Table 3). When considering only samples with tumor purity higher than 35% (n=31) the overall agreement increased to 97%. PPA: positive percent agreement; NPA: negative percent agreement; OPA: overall percent agreement; CI: confidence interval.

The distribution of tumor purity across 78 samples evaluated for MHC status between whole exome sequencing and PGDx Elio™ tissue complete is shown in FIG. 3A. FIG. 3B shows the distribution of the tumor purity among those cases assigned incorrect MHC status. False positives (3 cases) and false negatives (6 cases) of LOH of MHC (Table 3) were associated with low tumor purity. More specifically, discordance was observed in specimens with tumor purity below 35%.

These data show a correlation of LOH-MHC detection between WES and PGDx Elio™ complete.

Example 3

This example describes in silico correlation of TMB and MHC status to clinical outcomes in NSCLC patients.

Figure 4:
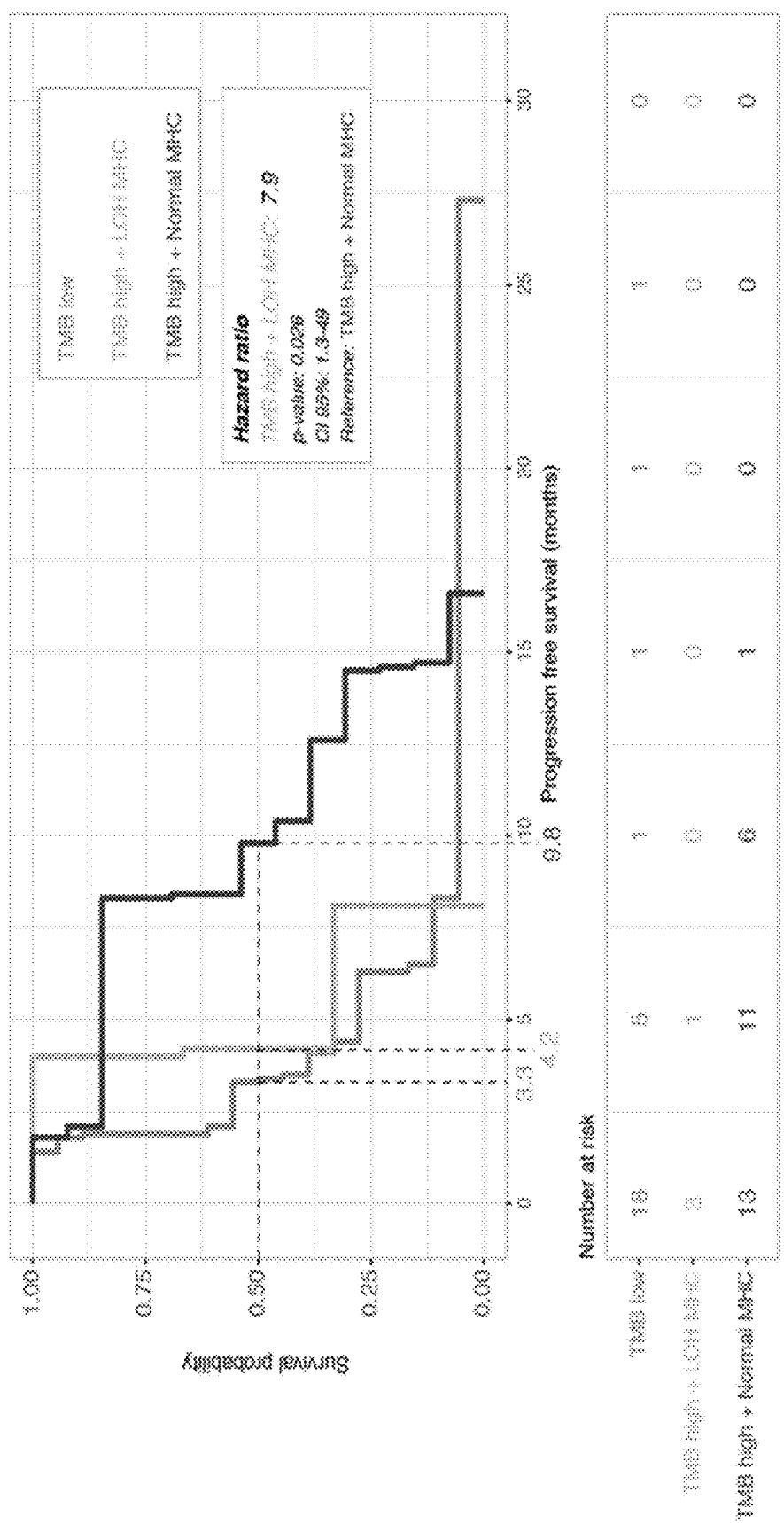
FIG. 4 shows correlation of in silico TMB and MHC status to clinical outcomes in NSCLC patients.

The hypothesis that TMB should be considered together with the tumor's ability to present these putative neoantigens as a predictor of response to checkpoint inhibitor therapy was evaluated next. PGDx Elio™ tissue complete results were simulated in silico from a published NSCLC cohort with available WES data and patient outcome results to checkpoint inhibitor treatment (Rizvi N A, et al. Mutational landscape determines sensitivity to PD-1 blockade in non-small cell lung cancer. Science. 2015 Apr. 3; 348(6230): 124-8). Patients were stratified into TMB-low (≤120 mutations per exome; first from left; dark gray) and TMB-high (>120 mutations per exome) with either normal MHC (third from left; black) or LOH of MHC (second from left; light gray) (FIG. 4). Patients with TMB-high and normal MHC (third from left; black) had a better response than those who were TMB-high but LOH MHC (second from left; light gray) and TMB low (first from left; dark gray). Patients with TMB-High but LOH of MHC presented a similar pattern of survival rate than TMB-Low cases, with the latter considered not likely responders to checkpoint inhibitor treatment.

Results shown in FIG. 4 confirmed the hypothesis that it was possible to measure TMB and evaluate potential antigen presentation in the same NGS assay. Without being limited by theory, loss of antigen presentation caused by mutations and loss of heterozygosity (LOH) of MHC Class I genes has been shown to be a common means of evading CD-8+ T-Cell destruction; thus, monitoring MHC status may augment the usefulness of TMB for predicting response.

For the above panel of 34 NSCLC samples that has been analyzed by whole exome sequencing and for which outcome of checkpoint inhibitors therapy (pembrolizumab) is publicly available (Rizvi N A, et al. Mutational landscape determines sensitivity to PD-1 blockade in non-small cell lung cancer. Science. 2015 Apr. 3; 348(6230):124-8), the PGDx Elio™ tissue complete panel has been simulated by removing regions from the exome that are not present in the PGDx Elio™ tissue complete panel. The inventive methods have shown shorter progression free survival (PFS) in high TMB patients with LOH of the MHC Class I genes, as compared to high TMB patients with normal MHC Class I genes (see, e.g., FIGS. 2-4 and Tables 2-3). Thus, adding NGS analyses of the two genes (MHC Class I and B2M) of the antigen presenting complex to current TMB testing with the PGDx Elio™ tissue complete panel provides better outcome prediction for cancer patients being considered for treatment with checkpoint inhibitors, including but not limited to pembrolizumab and nivolimumab.

In sum, patients that were either TMB-low (≤120 mutations per exome) or TMB-high but with predicted LOH of MHC had a poorer outcome and higher hazard ratio (7.9, CI 95% 1.3-49) than patients with high TMB and intact MHC. Testing of 190 cancer patients showed that in FFPE tissue samples with ≥20% tumor content, LOH of the MHC Class I could be detected with with 88% accuracy. These results support the use of the combined evaluation of TMB and the potential for antigen presentation to predict patient outcome. Thus, patients with high mutation burden may have different responses to immunotherapy depending on MHC status (Table 4).

TABLE 4

Prediction of potential responders to immune checkpoint inhibitor therapy by MHC status.

| | Normal MHC | Abnormal MHC |
|---|---|---|
| TMB - High | Likely Responder | Less Likely Responder |
| TMB - Low | Less Likely Responder | Less Likely Responder |

Without being limited by theory, the inventors found, unexpectedly, that there appears to be a very strong biological effect to see the survival differences in such a small sample set (n=34). One might have seen such results with whole exome sequencing; however, using only a limited gene set, e.g., PGDx Elio™ tissue complete test which has only 71 ROI in 6p21 around the HLA Class I genes, it was unclear and unpredictable whether the genes would be close enough, or if one would need to redesign the 507 gene panel to include the MHC Class I genes themselves. In one aspect, it is possible to add MHC Class I genes to the 507 genes in the PGDx Elio™ tissue complete test (or any other similar gene panel) or potentially apply novel machine learning approaches to LOH detection.

Taken together, the data demonstrate the capabilities of PGDx Elio™ tissue complete to measure TMB and to evaluate the genes involved in antigen presentation within a single next-generation sequencing product in development. The data further show that TMB and MHC status correlated to clinical outcomes in NSCLC patients in silico. Without being limited by theory, these data support considering TMB together with a tumor's ability to present putative neoantigens as measured by LOH of MHC, for example, for determining treatment regiments and selecting patients for treatment with immunotherapy such as checkpoint inhibitor therapy, for example.

Example 4

This example describes analysis of TMB and somatic alterations of the antigen presentation complex in cancer.

Samples from cancers including, but not limited to, breast cancer, pancreatic cancer, lung cancer, melanoma, hematopoietic cancer, leukemias, colon cancer, kidney cancer, head and neck cancer, brain cancer, bone cancer, ovarian cancer, cervical cancer, endometrial cancer, and prostate cancer are analyzed using the algorithm and the PGDx Elio™ tissue complete assay as described in Examples 1-3 above. Both fresh and fresh-frozen or preserved tissue samples can be analyzed, including formalin-fixed paraffin-embedded (FFPE) tissue or tissue preserved by any other method known in the art.

Combined measures of TMB and LOH at MHC Class I and/or B2M loci are used to determine responses to immunotherapy, such as checkpoint inhibitor therapy, for example. For example, cancer samples showing high TMB and no LOH or no abnormality at MHC Class I and/or B2M loci indicate a positive response to immunotherapy, such as checkpoint inhibitor therapy, for example. Thus, the patient from whom the sample was taken will likely be a responder and can be selected to receive immunotherapy, including checkpoint inhibitor therapy. Patients whose samples show low TMB and no LOH, i.e., no abnormality at MHC Class I and/or B2M loci, and patients whose samples show LOH or abnormalities at MHC Class I and/or B2M loci in the context of either low or high TMB are not likely responders to immunotherapy, such as checkpoint inhibitor therapy. Thus, these patients may not be selected for immunotherapy, such as checkpoint inhibitor therapy, but can be selected for other treatment regimens.

In summary, the methods provided herein can be used to predict patient response to therapeutic regiments, select therapeutic regimens for treatment of cancer, and select patients for treatment with immunotherapy.

Example 5

This example illustrates testing for Loss of Heterozygosity (LOH) using PGDx Elio™ complete (Wolverine).

Without being limited by theory, LOH of the MHC Class I and β2M genes is associated with resistance to immunotherapy by preventing neoantigen presentation by the tumor cell. Whether the PGDx Elio™ complete (Wolverine) panel was able to reliably detect LOH of the MHC Class I genes on chromosome 6p21 was tested, as further described below. Further, whether analysis of LOH status of the MHC Class I genes combined with tumor mutation burden (TMB) improves outcome prediction for cancer patients treated with checkpoint inhibitors such as Pembrolizumab (KEYTRUDA), Nivolumab (OPDIVO), Atezolizumab (TECENTRIQ), Avelumab (BAVENCIO), Durvalumab (IMFINZI), or Ipilimumab (YERVOY), for example, was evaluated (e.g., Examples 3 and 4 above).

Figure 5:
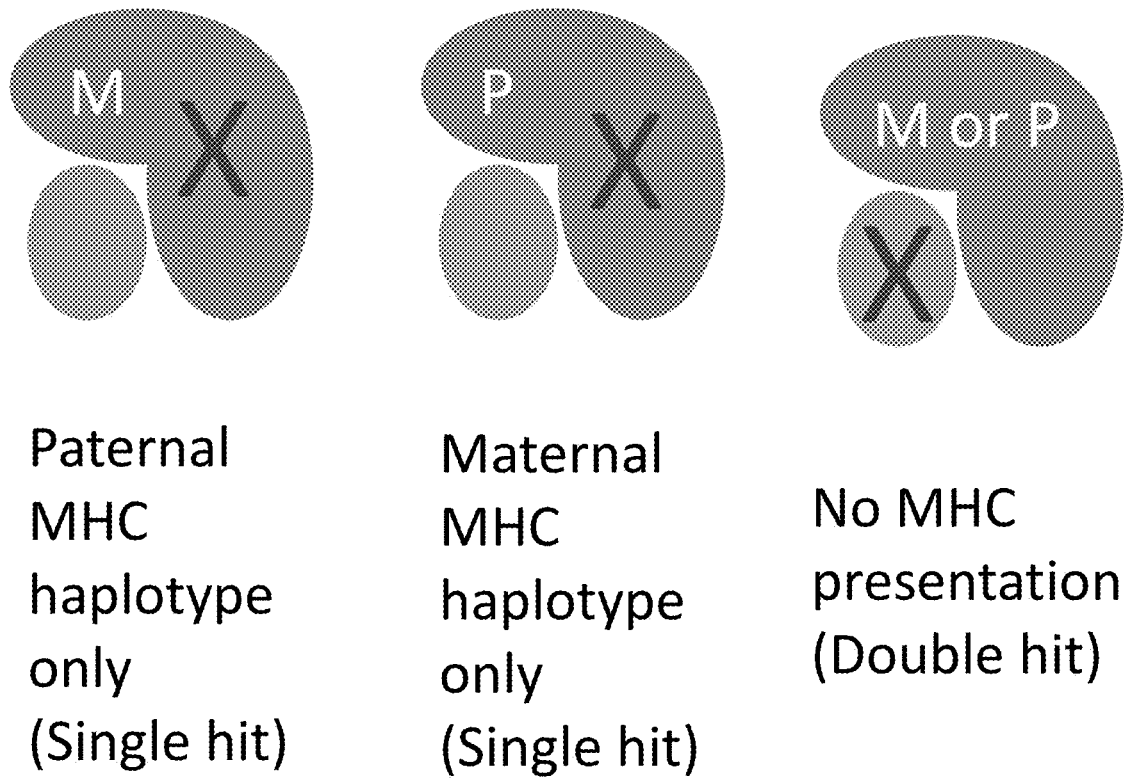
FIG. 5 illustrates single and double hits on maternal and paternal MHC alleles.
Figure 6:
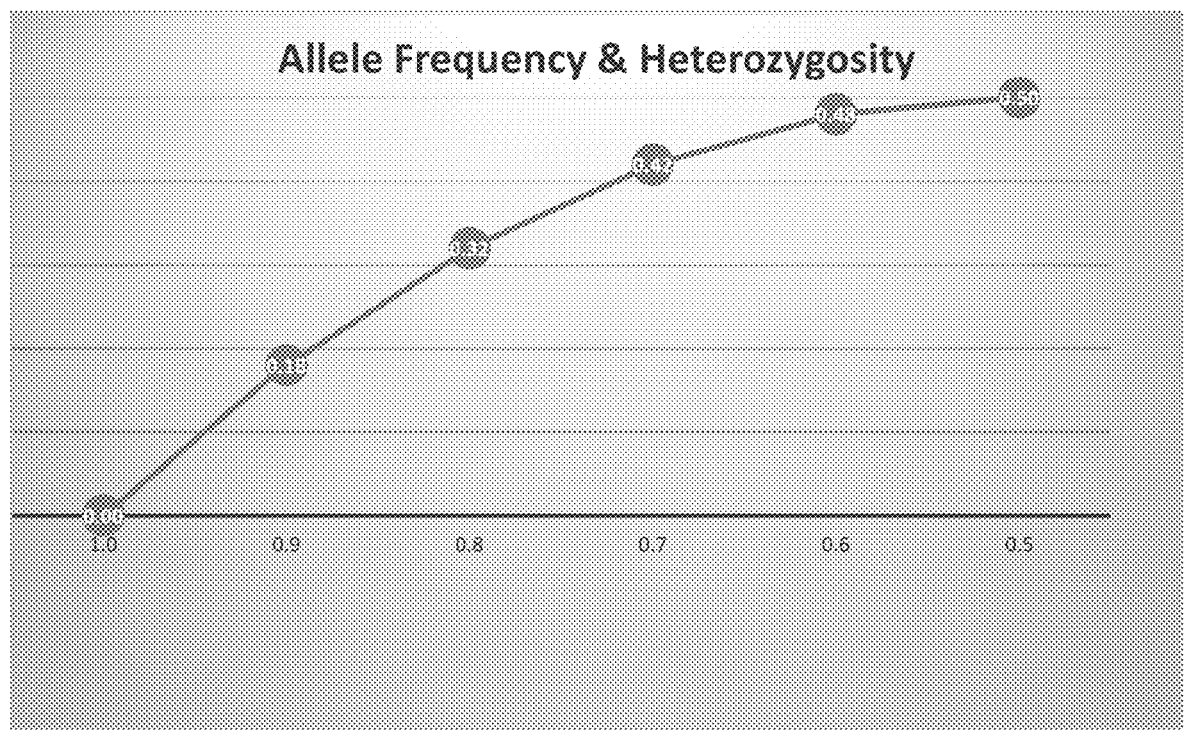
FIG. 6 shows a correlation between allele frequency and heterozygosity.

The effect of single and double mutation of maternal and paternal MHC genes is shown in FIG. 5. Mutation of both maternal and paternal MHC alleles results in loss of MHC presentation. The correlation between heterozygosity and allele frequency for LOH testing is shown in FIG. 6. Heterozygosity can be used to confirm loss of chromosomal regions. Heterozygosity is directly proportional to allele frequency, with a variability of 0.0 to 0.5 per locus. Without being limited by theory, LOH can be inferred by the presence of contiguous homozygosity that cannot occur by chance in diploid cells. For example, a long run of homozygosity is more likely due to somatic loss of a chromosomal region than due to chance distribution of homozygosity in adjacent single nucleotide polymorphisms (SNPs).

The MHC region on chromosome 6p21 is shown in FIG. 7. The region chr6:28,510,120-33, 480, 577 spans all or almost all HLA genes, such as the exemplary genes shown in Table 5.

TABLE 5

Region chr6: 28,510,120-33,480,577 spans all/almost HLA genes.

| | |
|---|---|
| HLA-F | HLA-DRB6 |
| HLA-V | HLA-DRB1 |
| HLA-P | HLA-DQA1 |
| HLA-G | HLA-DQB1 |
| HLA-H | HLA-DQB1- |
| HLA-T | AS1 |
| HLA-K | HLA-DQB3 |
| HLA-U | HLA-DQA2 |
| HLA-A | HLA-DQB2 |
| HLA-W | HLA-DOB |
| HLA-J | HLA-Z |
| HLA-L | HLA-DMB |
| HLA-N | HLA-DMA |
| HLA-E | HLA-DOA |
| HLA-C | HLA-DPA1 |
| HLA-B | HLA-DPB1 |
| HLA-S | HLA-DPA2 |
| HLA-DRA | HLA-DPB2 |
| HLA-DRB9 | HLA-DPA3 |
| HLA-DRB5 | |

In initial analysis, the length of regions investigated spanned 4,970,457 Mb (approximately 5 Mb). A total of 102 samples was evaluated. For exome analysis, the number of non-overlapping exons in the region was 1750. The overall length of exons in that region was about 727 kb (about 14%). The number of investigated heterozygous sites in the exome data was 1217. For analysis using the PGDx Elio™ complete (Wolverine) panel, the number of regions of interest (ROIs) in the region was 71. The overall length of ROIs in that region was about 19 kb (about 0.4%). The number of investigated heterozygous sites in those ROIs was 52. Samples selected at the two ends of the spectrum to evaluate detection of LOH using the PGDx Elio™ complete (Wolverine) panel are shown in FIG. 8.

FIG. 9A and FIG. 9B show confirmation of the LOH signal obtained with PGDx Elio™ complete (Wolverine) by exome data of the same samples. Samples identified by PGDx Elio™ complete (Wolverine) as heterozygous (0448) and homozygous (0426) are shown. The plot shown in FIG. 9A shows whole exome sequencing (WES) data that confirmed sample 0048 as heterozygous. The plot shown in FIG. 9B shows whole exome sequencing (WES) data that confirmed sample 0426 as homozygous. Thus, WES data confirmed the LOH calls made with PGDx Elio™ complete (Wolverine).

Figure 10A:
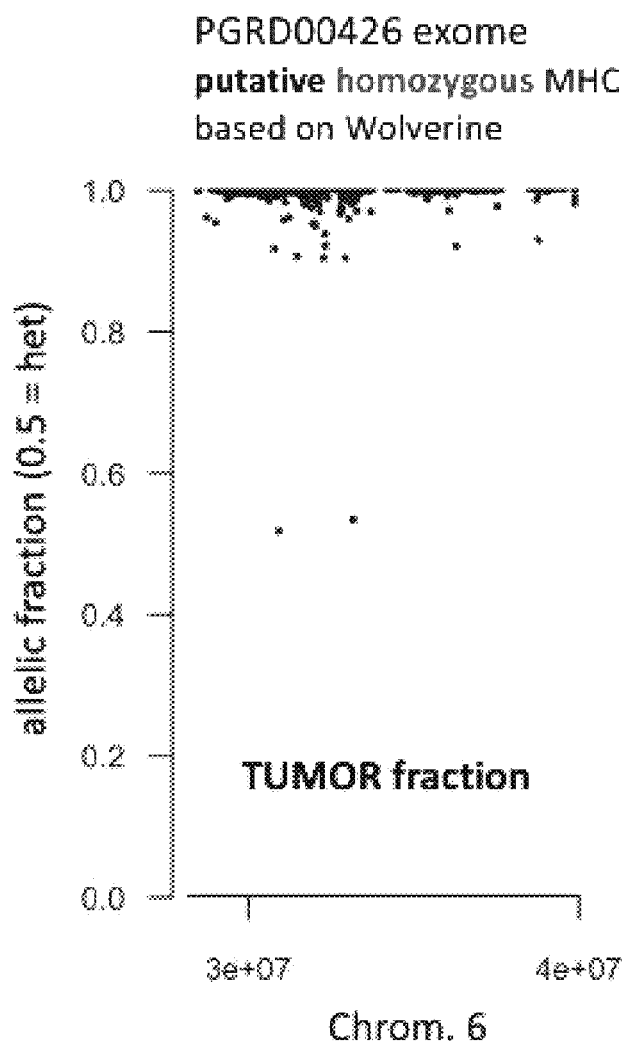
FIGS. 10A-10B show that LOH of MHC for PGRD00426 is specific to the tumor fraction.
Figure 10B:
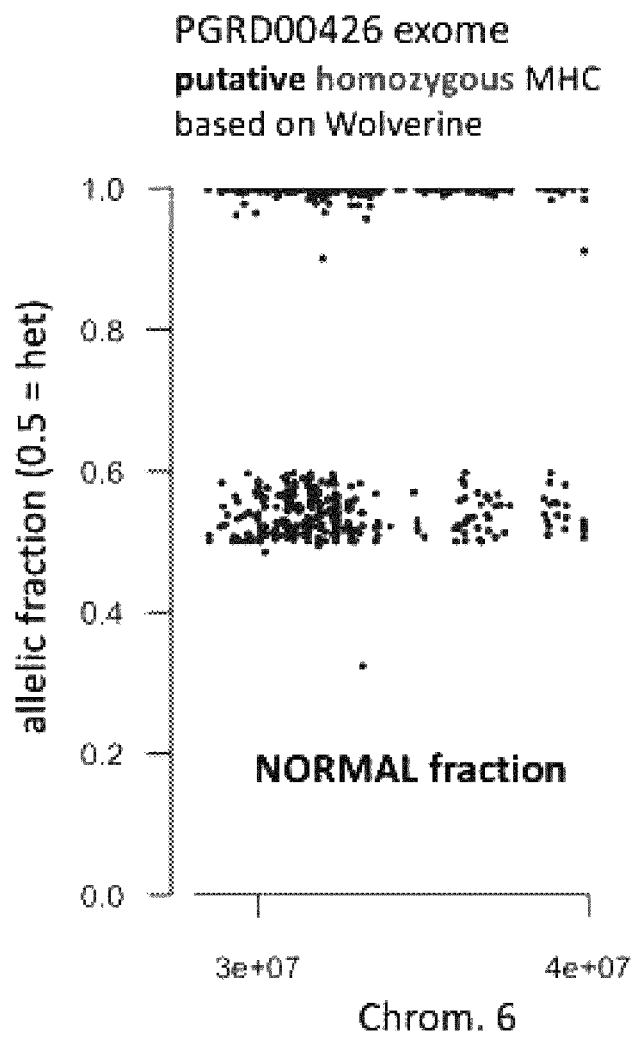

FIG. 10A and FIG. 10B show that LOH of MHC in sample PGRD00426 was specific to the tumor fraction, as confirmed by WES. LOH calls in tumor samples using PGDx Elio™ complete (Wolverine) and confirmed by WES (FIG. 10A) were not found in matching normal samples from the same patient (FIG. 10B). These results confirmed that LOH was tumor specific.

Taken together, these data show that PGDx Elio™ complete (Wolverine) reported LOH at the MHC Class I gene cluster, chromosome 6p and can report whole chromosome 6 loss. The analysis with 52 SNPs above in the MHC gene cluster showed good agreement with exome data. Without being limited by theory, addition of LOH detection to PGDx Elio™ complete (Wolverine) provides for best in class immunotherapy response prediction, as detailed above (e.g., Examples 3-4) and clearly differentiates the methods for TMB testing provided herein from other methods.

Without being limited by theory, the detection of LOH MHC with PGDx elio complete (Wolverine) can be improved with a more sophisticated algorithm, for example. As an example, the number of SNPs evaluated can be expanded by expanding the region being analyzed. Without being limited by theory, such an expansion is possible because most LOH cases are due to loss of one arm or complete loss of chromosome 6. Further, copy number variation (CNV) and estimated of tumor purity can be included. In addition, better cutoffs for calling LOH using PGDx Elio™ complete (Wolverine) can be defined based on LOH of tumor exome data as a standard (for samples used in TMB studies, for example).

Although the invention has been described with reference to the above examples, it will be understood that modifications and variations are encompassed within the spirit and scope of the invention. Accordingly, the invention is limited only by the following claims.

What is claimed is:

1. A method comprising:
   (a) determining a tumor mutation burden (TMB) score as high for coding exons of nucleic acid in a tumor sample obtained from a human cancer patient, wherein the determining the TMB score as high comprises:
      determining a number of mutations per megabase (Mb) using a genomic profiling assay that targets >500 genes including a major histocompatibility complex (MHC) class I gene and does not target a whole human exome, and
      estimating a number of mutations per exome based on the number of mutations per Mb,
   wherein the TMB score is determined to be a high TMB score when there are greater than 120 mutations per exome, and wherein the genomic profiling assay uses hybrid capture to capture the MHC class I gene;
   (b) detecting, using the genomic profiling assay, a presence of a loss of heterozygosity (LOH) status near or at the MHC class I gene locus in the nucleic acid from the tumor sample;
   (c) predicting the human cancer patient as not a likely responder to an administration with a checkpoint inhibitor; and
   (d) administering a treatment regimen other than the checkpoint inhibitor to the human cancer patient, wherein the treatment regimen comprises an activation immunotherapy that is not a checkpoint inhibitor, a suppression immunotherapy, a chimeric antigen receptor (CAR) T-cell therapy, a tumor-infiltrating lymphocyte (TIL) therapy, a T-cell receptor (TCR) therapy, a chemotherapy, a radioactive therapy, or a cancer vaccine.

2. The method of claim 1, wherein the cancer is selected from breast, pancreatic, lung, melanoma, hematopoietic cancers and leukemias, colon, kidney, head and neck, brain, bone, ovarian, cervical, endometrial and prostate cancer.

3. The method of claim 1, wherein the checkpoint inhibitor is pembrolizumab, nivolumab, atezolizumab, avelumab, durvalumab, or ipilimumab.

4. The method of claim 1, wherein the genomic profiling assay targets 507 genes.

5. The method of claim 1, wherein the mutations comprise a neoantigen or neoepitope recognized by a T cell.

6. The method of claim 5, wherein the neoantigen includes a neoantigen presenting complex locus comprising regions near or including a B2M gene.

7. The method of claim 1, wherein the MHC class I gene comprises one or more human leukocyte antigen (HLA) genes selected from the group consisting of HLA-F, HLA-V, HLA-P, HLA-G, HLA-H, HLA-T, HLA-K, HLA-U, HLA-A, HLA-W, HLA-J, HLA-L, HLA-N, HLA-E, HLA-C, HLA-B, HLA-S, HLA-DRA, HLA-DRB9, HLA-DRB5, HLA-DRB6, HLA-DRB1, HLA-DQA1, HLA-DQB1, HLA-DQB1-AS1, HLA-DQB3, HLA-DQA2, HLA-DQB2, HLA-DOB, HLA-Z, HLA-DMB, HLA-DMA, HLA-DOA, HLA-DPA1, HLA-DPB1, HLA-DPA2, HLA-DPB2 and HLA-DPA3.

8. The method of claim 1, wherein the detecting the presence of the LOH status comprises detecting an allelic imbalance in the nucleic acid.

9. The method of claim 8, wherein the detecting the allelic imbalance comprises detecting an uneven number of copies of the MHC class I gene locus.

10. The method of claim 9, wherein the detecting the uneven number of copies of the MHC class I gene locus comprises detecting somatic amplification, somatic deletion, contiguous homozygosity, and/or complete allelic loss.

11. The method of claim 1, wherein the TMB score and the LOH status are determined from a same next generation sequencing (NGS) assay.

12. The method of claim 1, wherein the genes targeted by the genomic profiling assay comprise oncogenes, tumor suppressor genes, genes encoding tumor antigens produced by oncogenic viruses, genes encoding cell surface glycolipids and glycoproteins and/or genes encoding oncofetal antigens.

13. The method of claim 1, wherein the number of mutations per exome is estimated using extrapolation based on a correlation between the number of mutations per Mb and the number of mutations per exome.

14. The method of claim 1, wherein the presence of the LOH status is detected near or at the MHC class I gene locus and at a B2M gene locus in the nucleic acid from the tumor sample.

15. The method of claim 1, wherein the treatment regimen is the chemotherapy.

16. The method of claim 1, wherein the treatment regimen is the CAR T-cell therapy.

17. The method of claim 1, wherein the treatment regimen is the activation immunotherapy that is not a checkpoint inhibitor.

18. The method of claim 1, wherein the treatment regimen is the suppression immunotherapy.

19. The method of claim 1, wherein the treatment regimen is the TIL therapy.

20. The method of claim 1, wherein the treatment regimen is the TCR therapy.

21. The method of claim 1, wherein the treatment regimen is the radioactive therapy.

22. The method of claim 1, wherein the treatment regimen is the cancer vaccine.

* * * * *